United States Patent
Blum et al.

(10) Patent No.: US 10,481,417 B2
(45) Date of Patent: Nov. 19, 2019

(54) MAGNETIC ATTACHMENT MECHANISM FOR ELECTRONIC WEARABLE DEVICE

(71) Applicant: POGOTEC, INC., Roanoke, VA (US)

(72) Inventors: Ronald D. Blum, Roanoke, VA (US); William Kokonaski, Belfair, WA (US); Richard Clompus, Trinidad, CA (US); Walter Dannhardt, Roanoke, VA (US); Massimo Pinazza, Domegge di Cadore (IT); Claudio Dalla Longa, Valdobbiadene (IT); Anita Trajkovska-Broach, Christiansburg, VA (US)

(73) Assignee: PogoTec, Inc., Roanoke, VA (US)

( * ) Notice: Subject to any disclaimer, the term of this patent is extended or adjusted under 35 U.S.C. 154(b) by 145 days.

(21) Appl. No.: 15/842,112

(22) Filed: Dec. 14, 2017

(65) Prior Publication Data

US 2018/0129078 A1 May 10, 2018

Related U.S. Application Data

(63) Continuation-in-part of application No. 15/179,018, filed on Jun. 10, 2016, now Pat. No. 10,241,351.

(Continued)

(51) Int. Cl.
*G02C 1/00* (2006.01)
*G02C 11/00* (2006.01)
(Continued)

(52) U.S. Cl.
CPC ............... *G02C 11/10* (2013.01); *G02C 5/008* (2013.01); *G02C 5/14* (2013.01); *G02C 5/146* (2013.01);
(Continued)

(58) Field of Classification Search
CPC .................. G02C 11/10; G02C 3/003
(Continued)

(56) References Cited

U.S. PATENT DOCUMENTS

| | | |
|---|---|---|
| 3,476,467 A | 11/1969 | Curry |
| 3,593,449 A | 7/1971 | Nielson |

(Continued)

FOREIGN PATENT DOCUMENTS

| | | |
|---|---|---|
| CA | 154079 S | 12/2014 |
| CN | 201318005 | 9/2009 |

(Continued)

OTHER PUBLICATIONS

U.S. Appl. No. 15/863,474, entitled "Wearable Camera Systems and Apparatus and Method for Attaching Camera Systems or Other Electronic Devices to Wearable Articles", filed Jan. 5, 2018, pp. all.

(Continued)

*Primary Examiner* — Hung X Dang

(57) ABSTRACT

An electronic wearable device may include a device body including at least one electronic component, the device body having an attachment side configured to movably attach the electronic wearable device directly to an eyewear temple by magnetic attraction between the electronic wearable device and the eyewear temple, wherein a first magnet or ferromagnetic material is located on or within the electronic wearable device and a second magnet or ferromagnetic material is located within or on the eyewear temple, wherein the device body is positionable at a first position along a length of the eyewear temple and in a second position along the length of the eyewear temple while remaining attached to the eyewear temple, and wherein the first magnet or ferromagnetic material does not contact a surface of the second magnet or ferromagnetic material.

21 Claims, 24 Drawing Sheets

Related U.S. Application Data

(60) Provisional application No. 62/306,331, filed on Mar. 10, 2016, provisional application No. 62/289,488, filed on Feb. 1, 2016, provisional application No. 62/253,813, filed on Nov. 11, 2015, provisional application No. 62/249,839, filed on Nov. 2, 2015, provisional application No. 62/246,803, filed on Oct. 27, 2015, provisional application No. 62/186,341, filed on Jun. 29, 2015, provisional application No. 62/180,199, filed on Jun. 16, 2015, provisional application No. 62/173,741, filed on Jun. 10, 2015, provisional application No. 62/536,573, filed on Jul. 25, 2017.

(51) Int. Cl.
  *G02C 5/14* (2006.01)
  *G02C 5/22* (2006.01)
  *G02C 5/00* (2006.01)

(52) U.S. Cl.
  CPC ............... *G02C 5/22* (2013.01); *G02C 11/00* (2013.01); *G02C 2200/02* (2013.01)

(58) Field of Classification Search
  USPC .................................................. 351/158, 41
  See application file for complete search history.

(56) References Cited

U.S. PATENT DOCUMENTS

| | | |
|---|---|---|
| 3,780,918 A | 12/1973 | Curtis |
| 4,379,988 A | 4/1983 | Mattatall |
| 4,405,213 A | 9/1983 | Kolkmann |
| 4,457,461 A | 7/1984 | Docking et al. |
| 4,506,961 A | 3/1985 | Palmieri |
| 4,516,157 A | 5/1985 | Campbell |
| 4,781,315 A | 11/1988 | Nordskog |
| 4,791,963 A | 12/1988 | Gronert et al. |
| 4,816,031 A | 3/1989 | Pfoff |
| 4,845,755 A | 7/1989 | Busch et al. |
| 4,918,737 A | 4/1990 | Luethi |
| 5,181,051 A | 1/1993 | Townsend et al. |
| D354,505 S | 1/1995 | Francavilla |
| 5,416,537 A | 5/1995 | Sadler |
| 5,568,207 A | 10/1996 | Chao |
| 5,606,743 A | 2/1997 | Vogt et al. |
| 5,608,808 A | 3/1997 | Da Silva |
| 5,623,703 A | 4/1997 | Takagi et al. |
| 5,636,775 A | 6/1997 | Kartsotis et al. |
| D385,290 S | 10/1997 | Totsuka et al. |
| 5,786,789 A | 7/1998 | Janky |
| 5,913,815 A | 6/1999 | Ball et al. |
| 5,915,588 A | 6/1999 | Stoken et al. |
| 6,020,920 A | 2/2000 | Anderson |
| 6,028,413 A | 2/2000 | Brockmann |
| 6,076,927 A | 6/2000 | Owens |
| 6,091,546 A | 7/2000 | Spitzer |
| 6,120,146 A | 9/2000 | Harris |
| 6,157,291 A | 12/2000 | Kuenster et al. |
| 6,215,460 B1 | 4/2001 | Mizoguchi et al. |
| 6,275,681 B1 | 8/2001 | Vega et al. |
| 6,282,302 B1 | 8/2001 | Hara |
| 6,657,673 B2 | 12/2003 | Ishikawa et al. |
| 6,711,744 B1 | 3/2004 | Hockenbury |
| 6,735,897 B1 | 5/2004 | Schmitter |
| 6,783,238 B1 | 8/2004 | Stepper |
| 6,977,479 B2 | 12/2005 | Hsu |
| 7,003,353 B1 | 2/2006 | Parkhouse |
| 7,092,763 B1 | 8/2006 | Griffith et al. |
| 7,126,558 B1 | 10/2006 | Dempski |
| D531,656 S | 11/2006 | Della Valle |
| 7,158,096 B1 | 1/2007 | Spitzer |
| 7,203,134 B1 | 4/2007 | Jackson |
| 7,229,168 B2 | 6/2007 | Kidouchim |
| 7,236,356 B2 | 6/2007 | Ulla et al. |
| 7,320,514 B2 | 1/2008 | Smith |
| D563,454 S | 3/2008 | Miklitarian |
| 7,409,234 B2 | 8/2008 | Glezerman |
| 7,435,019 B2 | 10/2008 | Lee |
| 7,597,440 B1 | 10/2009 | Magal |
| 7,618,260 B2 | 11/2009 | Daniel et al. |
| 7,656,439 B1 | 2/2010 | Manico et al. |
| 7,684,868 B2 | 3/2010 | Tai et al. |
| 7,793,361 B2 | 9/2010 | Ishihara et al. |
| 7,937,880 B1 | 5/2011 | Fidlow |
| 7,979,963 B2 | 7/2011 | Lee-Holowka et al. |
| 7,988,283 B2 | 8/2011 | Jannard |
| 8,046,948 B2 | 11/2011 | Mauch et al. |
| 8,068,169 B2 | 11/2011 | Chang |
| D650,411 S | 12/2011 | Fuchs |
| D653,202 S | 1/2012 | Hasbrook et al. |
| 8,109,629 B2 | 2/2012 | Howell et al. |
| 8,111,042 B2 | 2/2012 | Bennett |
| 8,123,352 B2 | 2/2012 | Matsumoto et al. |
| D659,094 S | 5/2012 | Brand et al. |
| 8,175,660 B2 | 5/2012 | Porwal |
| 8,193,781 B2 | 6/2012 | Lin et al. |
| D666,144 S | 8/2012 | Brand et al. |
| 8,299,877 B2 | 10/2012 | Hong et al. |
| D670,703 S | 11/2012 | Hasbrook et al. |
| D671,493 S | 11/2012 | Hasbrook et al. |
| 8,334,620 B2 | 12/2012 | Park et al. |
| D675,625 S | 2/2013 | Hasbrook et al. |
| D675,668 S | 2/2013 | Johnson et al. |
| D676,432 S | 2/2013 | Hasbrook et al. |
| 8,367,235 B2 | 2/2013 | Huang |
| 8,378,524 B2 | 2/2013 | Mita |
| 8,401,595 B2 | 3/2013 | Zhu et al. |
| 8,432,129 B2 | 4/2013 | Lee et al. |
| D682,914 S | 5/2013 | Fuchs |
| 8,469,508 B2 | 6/2013 | Silver et al. |
| 8,473,004 B2 | 6/2013 | Warren |
| 8,493,287 B2 | 7/2013 | Yamamoto |
| 8,534,514 B2 | 9/2013 | Zhu et al. |
| 8,541,975 B2 | 9/2013 | Park et al. |
| 8,571,609 B2 | 10/2013 | Hwang et al. |
| 8,587,241 B2 | 11/2013 | Maeda |
| 8,653,909 B2 | 2/2014 | Park et al. |
| D704,765 S | 5/2014 | Markovitz et al. |
| 8,716,899 B2 | 5/2014 | Yi et al. |
| 8,754,548 B2 | 6/2014 | Hong et al. |
| 8,778,022 B2 | 7/2014 | Blum et al. |
| 8,787,970 B2 | 7/2014 | Warren |
| D712,452 S | 9/2014 | Fuchs |
| 8,823,215 B2 | 9/2014 | Park et al. |
| 8,829,724 B2 | 9/2014 | Ryu et al. |
| 8,830,888 B2 | 9/2014 | Shin et al. |
| 8,842,635 B2 | 9/2014 | Kim et al. |
| 8,868,140 B2 | 10/2014 | Zhu et al. |
| 8,890,954 B2 | 11/2014 | O'Donnell et al. |
| 8,896,694 B2 | 11/2014 | O'Donnell et al. |
| 8,915,588 B2 | 12/2014 | Blum et al. |
| 8,922,161 B2 | 12/2014 | Choi et al. |
| D720,800 S | 1/2015 | Shin |
| 8,927,881 B2 | 1/2015 | Wittenberg et al. |
| 8,929,245 B2 | 1/2015 | Sivanesan et al. |
| 8,931,896 B2 | 1/2015 | Blum et al. |
| 8,934,045 B2 | 1/2015 | Karn et al. |
| 8,957,629 B2 | 2/2015 | Ryu et al. |
| 8,971,039 B2 | 3/2015 | Huang et al. |
| 8,987,942 B2 | 3/2015 | Kim et al. |
| D726,140 S | 4/2015 | Park et al. |
| D729,650 S | 5/2015 | Phillips et al. |
| 9,024,484 B2 | 5/2015 | Park et al. |
| 9,026,165 B2 | 5/2015 | Kim et al. |
| 9,030,052 B2 | 5/2015 | Kim et al. |
| 9,048,682 B2 | 6/2015 | Lee et al. |
| 9,048,683 B2 | 6/2015 | Lee et al. |
| 9,048,695 B2 | 6/2015 | Hwang et al. |
| 9,065,488 B2 | 6/2015 | Kim et al. |
| 9,075,249 B2 | 7/2015 | Heinrich et al. |
| 9,088,167 B2 | 7/2015 | Kim et al. |
| 9,088,171 B2 | 7/2015 | Won et al. |

(56) References Cited

U.S. PATENT DOCUMENTS

| | | |
|---|---|---|
| D737,889 S | 9/2015 | Yoo |
| 9,122,083 B2 | 9/2015 | Blum et al. |
| D741,943 S | 10/2015 | Keplinger |
| 9,152,130 B2 | 10/2015 | Pattikonda et al. |
| D742,372 S | 11/2015 | Christopher et al. |
| D743,477 S | 11/2015 | Strecker |
| D743,479 S | 11/2015 | Keplinger |
| D745,922 S | 12/2015 | Shen |
| D746,358 S | 12/2015 | Markovitz et al. |
| D755,787 S | 5/2016 | Zander et al. |
| 9,380,374 B2 | 6/2016 | Sprague et al. |
| D763,951 S | 8/2016 | Chae |
| D765,765 S | 9/2016 | Clegg |
| D766,770 S | 9/2016 | Devaney et al. |
| D767,013 S | 9/2016 | Hsu |
| D767,014 S | 9/2016 | Fuchs |
| D772,330 S | 11/2016 | Hsu |
| 9,628,707 B2 | 4/2017 | Blum et al. |
| 9,635,222 B2 | 4/2017 | Blum et al. |
| D787,582 S | 5/2017 | Desodt et al. |
| 9,823,494 B2 | 11/2017 | Blum et al. |
| 10,185,163 B2 * | 1/2019 | Blum .................... G02C 11/10 |
| 2002/0170147 A1 | 11/2002 | Heller |
| 2004/0080299 A1 | 4/2004 | Forster et al. |
| 2004/0088051 A1 | 5/2004 | Seligman |
| 2004/0221370 A1 | 11/2004 | Hannula et al. |
| 2005/0046786 A1 | 3/2005 | Smith |
| 2005/0083579 A1 | 4/2005 | Volkenandt et al. |
| 2005/0088811 A1 | 4/2005 | Ulla et al. |
| 2005/0167558 A1 | 8/2005 | Smith |
| 2005/0248717 A1 | 11/2005 | Howell et al. |
| 2006/0004546 A1 | 1/2006 | Slanec |
| 2006/0023158 A1 | 2/2006 | Howell et al. |
| 2006/0034478 A1 | 2/2006 | Davenport |
| 2006/0055786 A1 | 3/2006 | Ollila |
| 2006/0082730 A1 | 4/2006 | Franks |
| 2006/0095128 A1 | 5/2006 | Blum et al. |
| 2006/0121639 A1 | 6/2006 | Tai et al. |
| 2006/0268217 A1 | 11/2006 | Teng |
| 2007/0009253 A1 | 1/2007 | Nikkanen et al. |
| 2007/0013864 A1 | 1/2007 | Dietz |
| 2007/0023496 A1 | 2/2007 | Hall |
| 2007/0030442 A1 | 2/2007 | Howell et al. |
| 2007/0153639 A1 | 7/2007 | Lafever et al. |
| 2008/0034637 A1 | 2/2008 | Summers |
| 2008/0088791 A1 | 4/2008 | Smith |
| 2008/0116847 A1 | 5/2008 | Loke et al. |
| 2008/0163536 A1 | 7/2008 | Koch et al. |
| 2008/0180537 A1 | 7/2008 | Weinberg et al. |
| 2008/0208335 A1 | 8/2008 | Blum et al. |
| 2008/0231721 A1 | 9/2008 | Chou et al. |
| 2008/0239232 A1 | 10/2008 | Guerrero |
| 2008/0259269 A1 | 10/2008 | Grogan et al. |
| 2008/0301846 A1 | 12/2008 | Brillouet |
| 2009/0009410 A1 | 1/2009 | Dolgin et al. |
| 2009/0040308 A1 | 2/2009 | Temovskiy |
| 2009/0110386 A1 | 4/2009 | Kamada et al. |
| 2009/0173760 A1 | 7/2009 | Good |
| 2009/0189981 A1 | 7/2009 | Siann et al. |
| 2009/0207701 A1 | 8/2009 | Jacques |
| 2009/0243397 A1 | 10/2009 | Cook et al. |
| 2009/0251661 A1 | 10/2009 | Fuziak, Jr. |
| 2009/0264966 A1 | 10/2009 | Blum et al. |
| 2010/0036773 A1 | 2/2010 | Bennett |
| 2010/0045114 A1 | 2/2010 | Sample et al. |
| 2010/0053555 A1 | 3/2010 | Enriquez et al. |
| 2010/0073262 A1 | 3/2010 | Matsumoto |
| 2010/0103076 A1 | 4/2010 | Yamamoto |
| 2010/0157432 A1 | 6/2010 | Sugihara et al. |
| 2010/0164295 A1 | 7/2010 | Ichikawa et al. |
| 2010/0174629 A1 | 7/2010 | Taylor et al. |
| 2010/0177476 A1 | 7/2010 | Hotelling et al. |
| 2010/0187910 A1 | 7/2010 | Brengauz |
| 2010/0245757 A1 | 9/2010 | Sugihara et al. |
| 2010/0265655 A1 | 10/2010 | Metzler et al. |
| 2010/0284683 A1 | 11/2010 | Fressola et al. |
| 2010/0319096 A1 | 12/2010 | Scott et al. |
| 2011/0074349 A1 | 3/2011 | Ghovanloo |
| 2011/0115429 A1 | 5/2011 | Toivola et al. |
| 2011/0121042 A1 | 5/2011 | Weiss |
| 2011/0156639 A1 | 6/2011 | Ryu et al. |
| 2011/0184320 A1 | 7/2011 | Shipps et al. |
| 2011/0185538 A1 | 8/2011 | Hotellier et al. |
| 2011/0188677 A1 | 8/2011 | Rothkopf et al. |
| 2011/0193963 A1 | 8/2011 | Hess et al. |
| 2011/0221389 A1 | 9/2011 | Won et al. |
| 2011/0221390 A1 | 9/2011 | Won et al. |
| 2011/0222154 A1 | 9/2011 | Choi et al. |
| 2011/0225073 A1 | 9/2011 | Won et al. |
| 2011/0234012 A1 | 9/2011 | Yi et al. |
| 2011/0241438 A1 | 10/2011 | Kim et al. |
| 2011/0241612 A1 | 10/2011 | Ryu et al. |
| 2012/0062173 A1 | 3/2012 | Choi et al. |
| 2012/0075571 A1 | 3/2012 | Silver |
| 2012/0081658 A1 | 4/2012 | Sugihara et al. |
| 2012/0105740 A1 | 5/2012 | Jannard et al. |
| 2012/0127423 A1 | 5/2012 | Blum et al. |
| 2012/0153903 A1 | 6/2012 | Kim et al. |
| 2012/0164943 A1 | 6/2012 | Bennett |
| 2012/0169278 A1 | 7/2012 | Choi et al. |
| 2012/0189146 A1 | 7/2012 | Wuidart |
| 2012/0193996 A1 | 8/2012 | Ryu et al. |
| 2012/0280575 A1 | 11/2012 | Kim et al. |
| 2012/0286581 A1 | 11/2012 | Ryu et al. |
| 2012/0286582 A1 | 11/2012 | Kim et al. |
| 2012/0286726 A1 | 11/2012 | Kim et al. |
| 2012/0293008 A1 | 11/2012 | Park et al. |
| 2012/0293009 A1 | 11/2012 | Kim et al. |
| 2012/0293010 A1 | 11/2012 | Lee et al. |
| 2012/0294478 A1 | 11/2012 | Publicover et al. |
| 2012/0299390 A1 | 11/2012 | Kim et al. |
| 2012/0300872 A1 | 11/2012 | Kim et al. |
| 2012/0306269 A1 | 12/2012 | Kim et al. |
| 2012/0306284 A1 | 12/2012 | Lee et al. |
| 2012/0309304 A1 | 12/2012 | Kim et al. |
| 2012/0309305 A1 | 12/2012 | Kim et al. |
| 2012/0309306 A1 | 12/2012 | Kim et al. |
| 2012/0309308 A1 | 12/2012 | Kim et al. |
| 2012/0313445 A1 | 12/2012 | Park et al. |
| 2012/0313447 A1 | 12/2012 | Park et al. |
| 2012/0328043 A1 | 12/2012 | Kwon et al. |
| 2012/0329405 A1 | 12/2012 | Lee et al. |
| 2013/0015813 A1 | 1/2013 | Kim et al. |
| 2013/0026847 A1 | 1/2013 | Kim et al. |
| 2013/0033117 A1 | 2/2013 | Kim et al. |
| 2013/0035034 A1 | 2/2013 | Kim et al. |
| 2013/0039395 A1 | 2/2013 | Norconk et al. |
| 2013/0043734 A1 | 2/2013 | Stone et al. |
| 2013/0043737 A1 | 2/2013 | Yeo et al. |
| 2013/0049456 A1 | 2/2013 | Kim et al. |
| 2013/0049483 A1 | 2/2013 | Kim et al. |
| 2013/0057079 A1 | 3/2013 | Park et al. |
| 2013/0058379 A1 | 3/2013 | Kim et al. |
| 2013/0058380 A1 | 3/2013 | Kim et al. |
| 2013/0059533 A1 | 3/2013 | Kwon et al. |
| 2013/0062963 A1 | 3/2013 | Chernokalov et al. |
| 2013/0062964 A1 | 3/2013 | Chernokalov et al. |
| 2013/0062965 A1 | 3/2013 | Chernokalov et al. |
| 2013/0063082 A1 | 3/2013 | Lee et al. |
| 2013/0063083 A1 | 3/2013 | Park et al. |
| 2013/0063873 A1 | 3/2013 | Wodrich et al. |
| 2013/0082651 A1 | 4/2013 | Park et al. |
| 2013/0093255 A1 | 4/2013 | Jung et al. |
| 2013/0099588 A1 | 4/2013 | Yeo et al. |
| 2013/0099591 A1 | 4/2013 | Yeo et al. |
| 2013/0099732 A1 | 4/2013 | Lee et al. |
| 2013/0099733 A1 | 4/2013 | Park et al. |
| 2013/0099734 A1 | 4/2013 | Lee et al. |
| 2013/0101133 A1 | 4/2013 | Yoon et al. |
| 2013/0113296 A1 | 5/2013 | Ryu et al. |
| 2013/0113298 A1 | 5/2013 | Ryu et al. |
| 2013/0119780 A1 | 5/2013 | Kim et al. |
| 2013/0119929 A1 | 5/2013 | Partovi |
| 2013/0127410 A1 | 5/2013 | Park et al. |

(56) References Cited

U.S. PATENT DOCUMENTS

| | | |
|---|---|---|
| 2013/0128364 A1 | 5/2013 | Wheeler et al. |
| 2013/0130621 A1 | 5/2013 | Kim et al. |
| 2013/0134791 A1 | 5/2013 | Park et al. |
| 2013/0134927 A1 | 5/2013 | Park et al. |
| 2013/0147427 A1 | 6/2013 | Polu et al. |
| 2013/0154387 A1 | 6/2013 | Lee et al. |
| 2013/0154557 A1 | 6/2013 | Lee et al. |
| 2013/0154558 A1 | 6/2013 | Lee et al. |
| 2013/0162200 A1 | 6/2013 | Terry et al. |
| 2013/0176652 A1 | 7/2013 | Kim et al. |
| 2013/0176653 A1 | 7/2013 | Kim et al. |
| 2013/0181665 A1 | 7/2013 | Lee et al. |
| 2013/0187475 A1 | 7/2013 | Vendik et al. |
| 2013/0187598 A1 | 7/2013 | Park et al. |
| 2013/0200844 A1 | 8/2013 | Lee et al. |
| 2013/0201440 A1 | 8/2013 | Howell et al. |
| 2013/0207479 A1 | 8/2013 | Vendik et al. |
| 2013/0207851 A1 | 8/2013 | Dabov |
| 2013/0210378 A1 | 8/2013 | Zhu et al. |
| 2013/0214734 A1 | 8/2013 | Kang et al. |
| 2013/0214735 A1 | 8/2013 | Kang et al. |
| 2013/0215374 A1 | 8/2013 | Blum et al. |
| 2013/0216085 A1 | 8/2013 | Honeycutt |
| 2013/0221912 A1 | 8/2013 | Kang et al. |
| 2013/0221914 A1 | 8/2013 | Kim et al. |
| 2013/0221915 A1 | 8/2013 | Son et al. |
| 2013/0225082 A1 | 8/2013 | Kang et al. |
| 2013/0229614 A1 | 9/2013 | Marini et al. |
| 2013/0235332 A1 | 9/2013 | Blum et al. |
| 2013/0241308 A1 | 9/2013 | Bilbrey et al. |
| 2013/0249306 A1 | 9/2013 | Kim et al. |
| 2013/0250135 A1 | 9/2013 | Blum et al. |
| 2013/0250232 A1 | 9/2013 | Belbey et al. |
| 2013/0264997 A1 | 10/2013 | Lee et al. |
| 2013/0270920 A1 | 10/2013 | Yoon et al. |
| 2013/0278072 A1 | 10/2013 | Yoon et al. |
| 2013/0278207 A1 | 10/2013 | Yoo |
| 2013/0282117 A1 | 10/2013 | Van Heugten et al. |
| 2013/0300204 A1 | 11/2013 | Partovi |
| 2013/0320736 A1 | 12/2013 | Teufel et al. |
| 2013/0329183 A1 | 12/2013 | Blum et al. |
| 2014/0021796 A1 | 1/2014 | Song et al. |
| 2014/0022765 A1 | 1/2014 | Waters |
| 2014/0027521 A1 | 1/2014 | Pedicano et al. |
| 2014/0043580 A1 | 2/2014 | Steele |
| 2014/0044281 A1 | 2/2014 | Ganem et al. |
| 2014/0049211 A1 | 2/2014 | Park et al. |
| 2014/0058506 A1 | 2/2014 | Tai et al. |
| 2014/0062395 A1 | 3/2014 | Kwon |
| 2014/0070623 A1 | 3/2014 | Keeling et al. |
| 2014/0070624 A1 | 3/2014 | Kim et al. |
| 2014/0070625 A1 | 3/2014 | Kim et al. |
| 2014/0071644 A1 | 3/2014 | Yoon et al. |
| 2014/0077613 A1 | 3/2014 | Song et al. |
| 2014/0077614 A1 | 3/2014 | Park et al. |
| 2014/0084688 A1 | 3/2014 | Tzanidis et al. |
| 2014/0084858 A1 | 3/2014 | Kim et al. |
| 2014/0103873 A1 | 4/2014 | Partovi et al. |
| 2014/0111018 A1 | 4/2014 | Kwon et al. |
| 2014/0111153 A1 | 4/2014 | Kwon et al. |
| 2014/0113689 A1 | 4/2014 | Lee |
| 2014/0125278 A1 | 5/2014 | Kim et al. |
| 2014/0135592 A1 | 5/2014 | Ohnemus et al. |
| 2014/0139180 A1 | 5/2014 | Kim et al. |
| 2014/0139637 A1 | 5/2014 | Mistry et al. |
| 2014/0146282 A1 | 5/2014 | Lu |
| 2014/0152116 A1 | 6/2014 | Kim et al. |
| 2014/0152516 A1 | 6/2014 | Kim et al. |
| 2014/0159654 A1 | 6/2014 | Lee et al. |
| 2014/0183967 A1 | 7/2014 | Ryu et al. |
| 2014/0191593 A1 | 7/2014 | Moh |
| 2014/0197785 A1 | 7/2014 | Lee et al. |
| 2014/0203657 A1 | 7/2014 | Song et al. |
| 2014/0232980 A1 | 8/2014 | Harms et al. |
| 2014/0239280 A1 | 8/2014 | Takada et al. |
| 2014/0241555 A1 | 8/2014 | Terlizzi |
| 2014/0252875 A1 | 9/2014 | Lee |
| 2014/0253028 A1 | 9/2014 | Lee et al. |
| 2014/0253322 A1 | 9/2014 | Chapin |
| 2014/0265614 A1 | 9/2014 | Kim et al. |
| 2014/0265615 A1 | 9/2014 | Kim et al. |
| 2014/0266020 A1 | 9/2014 | van Lammeren et al. |
| 2014/0266988 A1 | 9/2014 | Fisher et al. |
| 2014/0267874 A1 | 9/2014 | Ratcliff et al. |
| 2014/0268017 A1 | 9/2014 | Sweis et al. |
| 2014/0285139 A1 | 9/2014 | Ahn et al. |
| 2014/0285141 A1 | 9/2014 | Lee et al. |
| 2014/0285142 A1 | 9/2014 | Lee et al. |
| 2014/0285416 A1 | 9/2014 | Priyantha et al. |
| 2014/0308987 A1 | 10/2014 | Wilson et al. |
| 2014/0312834 A1 | 10/2014 | Tanabe et al. |
| 2014/0313471 A1 | 10/2014 | Eubanks |
| 2014/0327319 A1 | 11/2014 | Byun et al. |
| 2014/0327393 A1 | 11/2014 | Lee et al. |
| 2014/0327409 A1 | 11/2014 | Lee et al. |
| 2014/0340033 A1 | 11/2014 | Kim et al. |
| 2014/0346888 A1 | 11/2014 | Kim et al. |
| 2014/0347006 A1 | 11/2014 | Kim et al. |
| 2014/0354880 A1 | 12/2014 | Han |
| 2014/0361736 A1 | 12/2014 | Kwon et al. |
| 2014/0361738 A1 | 12/2014 | Lee et al. |
| 2014/0375246 A1 | 12/2014 | Boysen, III et al. |
| 2014/0375256 A1 | 12/2014 | Lee et al. |
| 2015/0035991 A1 | 2/2015 | Sachs et al. |
| 2015/0046418 A1 | 2/2015 | Akbacak et al. |
| 2015/0049001 A1 | 2/2015 | Rahman et al. |
| 2015/0049201 A1 | 2/2015 | Liu et al. |
| 2015/0060506 A1 | 3/2015 | Cameron et al. |
| 2015/0061589 A1 | 3/2015 | Wodrich et al. |
| 2015/0070596 A1 | 3/2015 | Gadjali |
| 2015/0102995 A1 | 4/2015 | Shen et al. |
| 2015/0103304 A1 | 4/2015 | Darcy |
| 2015/0168727 A1 | 6/2015 | Qaddoura |
| 2015/0168729 A1 | 6/2015 | Kobayashi |
| 2015/0180286 A1 | 6/2015 | Asanuma et al. |
| 2015/0193949 A1 | 7/2015 | Katz et al. |
| 2015/0193980 A1 | 7/2015 | Pedley |
| 2015/0204949 A1 | 7/2015 | Von Novak, III |
| 2015/0234201 A1 | 8/2015 | Levesque |
| 2015/0236521 A1 | 8/2015 | Park et al. |
| 2015/0244204 A1 | 8/2015 | Lee et al. |
| 2015/0244341 A1 | 8/2015 | Ritter et al. |
| 2015/0244427 A1 | 8/2015 | Kim et al. |
| 2015/0244910 A1 | 8/2015 | Marston et al. |
| 2015/0249361 A1 | 9/2015 | Kim et al. |
| 2015/0249916 A1 | 9/2015 | Schlub et al. |
| 2015/0256021 A1 | 9/2015 | Kwon et al. |
| 2016/0025996 A1 | 1/2016 | Bacon |
| 2016/0026156 A1 | 1/2016 | Jackson et al. |
| 2016/0033792 A1 | 2/2016 | Blum et al. |
| 2016/0037025 A1 | 2/2016 | Blum |
| 2016/0072296 A1 | 3/2016 | Nejatali et al. |
| 2016/0104284 A1 | 4/2016 | Maguire et al. |
| 2016/0125656 A1 | 5/2016 | James et al. |
| 2016/0154239 A9 | 6/2016 | Layson, Jr. |
| 2016/0172870 A1 | 6/2016 | Blum et al. |
| 2016/0182826 A1 | 6/2016 | Blum et al. |
| 2016/0190859 A1 | 6/2016 | Blum et al. |
| 2016/0203359 A1 | 7/2016 | von und zu Liechtenstein |
| 2016/0206056 A1 | 7/2016 | Pluemer et al. |
| 2016/0225191 A1 | 8/2016 | Mullins |
| 2016/0261147 A1 | 9/2016 | Blum et al. |
| 2016/0294225 A1 | 10/2016 | Blum et al. |
| 2016/0349533 A1 | 12/2016 | Grassi |
| 2016/0363787 A1 | 12/2016 | Blum et al. |
| 2017/0024612 A1 | 1/2017 | Wexler et al. |
| 2017/0069192 A1 | 3/2017 | Sood et al. |
| 2017/0127196 A1 | 5/2017 | Blum et al. |
| 2017/0134645 A1 | 5/2017 | Kim et al. |
| 2017/0150049 A1 | 5/2017 | Blum et al. |
| 2017/0195529 A1 | 7/2017 | Blum |
| 2017/0223236 A1 | 8/2017 | Oberlander et al. |
| 2017/0272640 A1 | 9/2017 | Fuller et al. |

(56) References Cited

U.S. PATENT DOCUMENTS

| | | | |
|---|---|---|---|
| 2017/0363885 A1 | 12/2017 | Blum et al. | |
| 2018/0042369 A1 | 2/2018 | Blum et al. | |
| 2018/0063433 A1 | 3/2018 | Blum et al. | |

FOREIGN PATENT DOCUMENTS

| | | |
|---|---|---|
| CN | 202033546 U | 11/2011 |
| CN | 202153283 U | 2/2012 |
| CN | 202407553 | 9/2012 |
| CN | 202419070 | 9/2012 |
| CN | 202424276 | 9/2012 |
| CN | 202424277 | 9/2012 |
| CN | 202424278 | 9/2012 |
| CN | 202424279 | 9/2012 |
| CN | 202424807 | 9/2012 |
| CN | 102777487 | 11/2012 |
| CN | 202635909 | 1/2013 |
| CN | 202635910 | 1/2013 |
| CN | 202635911 | 1/2013 |
| CN | 202636015 | 1/2013 |
| CN | 202647093 | 1/2013 |
| CN | 202647094 | 1/2013 |
| CN | 202647101 | 1/2013 |
| CN | 202647104 | 1/2013 |
| CN | 202647111 | 1/2013 |
| CN | 202649874 | 1/2013 |
| CN | 202649875 | 1/2013 |
| CN | 202651825 | 1/2013 |
| CN | 202652281 | 1/2013 |
| CN | 202652282 | 1/2013 |
| CN | 202652304 | 1/2013 |
| CN | 202652305 | 1/2013 |
| CN | 202800463 | 3/2013 |
| CN | 202800547 | 3/2013 |
| CN | 202811809 | 3/2013 |
| CN | 202818399 | 3/2013 |
| CN | 202904151 U | 7/2013 |
| CN | 203084344 U | 7/2013 |
| CN | 203178585 | 9/2013 |
| CN | 203708487 U | 7/2014 |
| CN | 104273891 A | 1/2015 |
| DE | 202009015991 | 4/2010 |
| EP | 0736268 | 10/1996 |
| ES | 2165795 | 3/2002 |
| GB | 2472120 A | 1/2011 |
| JP | 07099596 A | 4/1995 |
| JP | H08505238 A | 6/1996 |
| JP | 2000138858 A | 5/2000 |
| JP | 4006856 B2 | 11/2007 |
| JP | 2008067285 A | 3/2008 |
| JP | 2012063641 A | 3/2012 |
| KR | 101421046 B1 | 7/2014 |
| KR | 1020140091195 A | 7/2014 |
| KR | 101646541 | 8/2016 |
| TW | M300818 U | 11/2006 |
| TW | 200843277 A | 11/2008 |
| TW | M395176 U | 12/2010 |
| TW | 201145748 A1 | 12/2011 |
| TW | 201415753 A | 4/2014 |
| WO | 9208157 A1 | 5/1992 |
| WO | 0106298 A1 | 1/2001 |
| WO | 02/45044 A1 | 6/2002 |
| WO | 2009/052705 A1 | 4/2009 |
| WO | 2011041733 A1 | 4/2011 |
| WO | 2012/039738 A1 | 3/2012 |
| WO | 2012/093986 A1 | 7/2012 |
| WO | 2013118162 A1 | 8/2013 |
| WO | 2013/188343 A1 | 12/2013 |
| WO | 2014/012536 A1 | 1/2014 |
| WO | 2014012451 A1 | 1/2014 |
| WO | 2014122538 A2 | 8/2014 |
| WO | 2016022499 A1 | 2/2016 |
| WO | 2016100339 A1 | 6/2016 |
| WO | 2016105480 A2 | 6/2016 |
| WO | 2016109577 A1 | 7/2016 |
| WO | 2016141349 A1 | 9/2016 |
| WO | 2016201261 A1 | 12/2016 |
| WO | 2016205373 A1 | 12/2016 |
| WO | 2017075405 | 5/2017 |
| WO | 20170223042 A1 | 12/2017 |
| WO | 20180031684 A1 | 2/2018 |

OTHER PUBLICATIONS

Pogocam: Capture Life in the Moment With a Camera for Glasses, http://web.archive.org/web/20171101052751/https://pogotec.com/products/pogocam Oct. 2017, pp. all.

U.S. Appl. No. 15/809,383 entitled "Wearable Camera Systems and Apparatus and Method for Attaching Camera Systems or Other Electronic Devices to Wearable Articles" filed Nov. 10, 2017, pp. all.

U.S. Appl. No. 15/917,413 entitled "Wireless Power Conversion System" filed Mar. 9, 2018, pp. all.

U.S. Appl. No. 15/672,971 entitled "Connectors for Attaching One or More Wearable Devices to Eyewear", filed Aug. 9, 2017, pp. all.

U.S. Appl. No. 15/789,574, entitled "Architecture for and Camera Devoid of Viewfinder", filed Oct. 20, 2017, pp. all.

U.S. Appl. No. 15/802,782 entitled "Wearable Camera System" filed Nov. 3, 2017, pp. all.

U.S. Appl. No. 15/807,308 entitled "A Smart Case for Electronic Wearable Device", filed Nov. 8, 2017, pp. all.

U.S. Appl. No. 15/843,639 entitled "Connectors for Attaching One or More Wearable Devices to Eyewear" filed Dec. 15, 2017, pp. all.

"Alpha—The World's Smallest 4K Action Camera", https://www.indiegogo.com/projects/alpha-the-world-s-smallest-4k-action-camera-sports; captured Oct. 9, 2017, pp. all.

"Inductive Limits in the Frequency Range 9 kHz to 148.5 kHz", ECC Reports 135, Electronic Communications Committee (ECC) with the European Conference of Postal and Telecommunications (CEPT); Bordeaux, Sep. 2009, 1-16.

U.S. Appl. No. 29/588,270, entitled "Eyewear Temple", filed Dec. 19, 2016.

Design U.S. Appl. No. 29/556,571, entitled "Eyewear Temple", filed Mar. 1, 2016, pp. all.

CT Band, "Make Your Watch Smart!", http://www.ct-band.com/en/; captured Nov. 10, 2016, pp. all.

Griffin, "Sleepsport Band", http://www.officesupplynow.com/xcart/GRFGB40139-Griffin-Case-sleepsport-Band-bk.html?gclid=CjwKEAjwnebABRCjpvr13dHL8DsSJABB-ILIBcOgYMmKeCs3g_rcvbST3HVWtuup_HzVQ3-Iv5YFOBoCcKw_wcB; captured Nov. 10, 2016, pp. all.

Kairos, "Kairos T-Band Only", https://kairoswatches.com/tbands/tband/; captured Nov. 10, 2016, pp. all.

Kiwi Wearable Technologies Ltd. "Glance: World's First Smart Accessory for Your Watch", https://www.kickstarter.com/projects/1742184757/glance-worlds-first-smart-accessory-for-your-watch; captured Nov. 10, 2016, pp. all.

Lynnette, "Fitbit Pouch for Watch Strap", https://www.etsy.com/listing/186507712/fitbit-pouch-for-watch-strap; captured Nov. 10, 2016, pp. all.

Main Tool, "Classi: The World's First Leather Smart Strap for Classic Watches", http://www.maintool.me/classi.html; captured Nov. 10, 2016, pp. all.

Marathon, "Marathon Watch Band Clip Compass", http://www.chronoworld.com/marathon-watch-band-dip-compass-co194004.html; captured Nov. 10, 2016, pp. all.

Modillion, "Modillion Turns Any "Dumb" Watch Into a Smart Watch", http://newatlas.com/modillian-smartwatch-strap/32059/; captured Nov. 10, 2016, pp. all.

Montblac-Simplo GMBH, "Wearable Technology Meets the Art of Fine Watchmaking", http://www.montblanc.com/en-us/discover/specials/montblanc-introduces-e-strap.html; captured Nov. 10, 2016, pp. all.

"Multi Functional Pouch Armband Ankel Band Wristband for Fitbit Flex Fitbit One Clip . . . ,", https://www.amazon.com/functional-armband-wristband-smartband-withings/dp/B00WALZXCW; captured Nov. 10, 2016, pp. all.

(56) References Cited

OTHER PUBLICATIONS

"Review of 1Bandid Sports & GPS Watch ID Bands", https://www.dcrainmaker.com/2011/09/review-of-1bandid-sports-gps-watch-id.html; captured Nov. 10, 2016, pp. all.
"This Weird Strap Lets You Make Phone Calls From Your Regular Watch", https://www.kickstarter.com/projects/hotsmartwatch/hot-band-the-smart-watch-band-for-any-watch?token=5d08da6f; captured Nov. 10, 2016, pp. all.
Nico Gerard, "Skyview Pinnacle", https://www.nicogerard.com/nico-gerard-skyview-pinnacle; captured Nov. 10, 2016, pp. all.
Taser International, Inc, "Taser Axon Flex System User Manual", TASER International Inc., 2015, p. 1-21, 2015.
Tombot, "Custom Watchband Holder for Fitbit Flex", http://www.shapeways.com/product/YWXHN5VYP/custom-watchband-holder-for-fitbit-flex?optionId=17995763; captured Nov. 10, 2016, pp. all.
Ubirds, "Unique Hand-Made Strap Discretely Adds Smart Features to Any Watch", http://newatlas.com/unique-smartwatch-strap/39458/; captured Nov. 10, 2016, pp. all.
Wotch, "Transform Your Wristwatch Into a Smart Device", http://www.wotch.de/; captured Nov. 10, 2016, pp. all.

\* cited by examiner

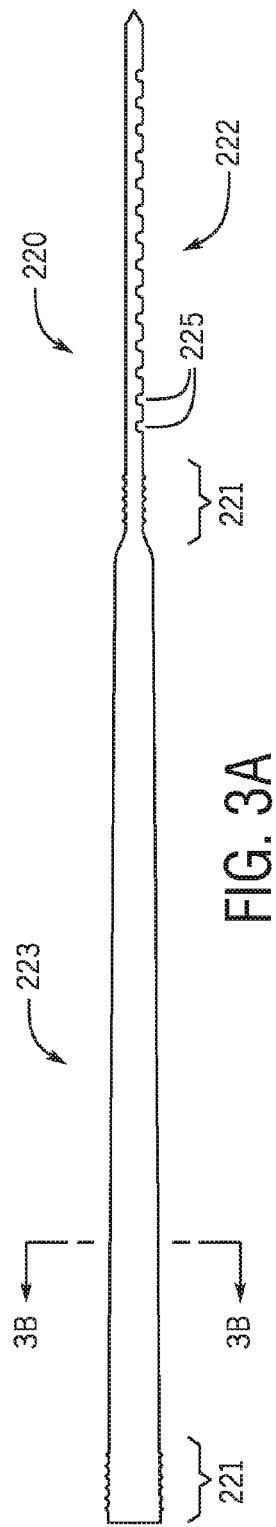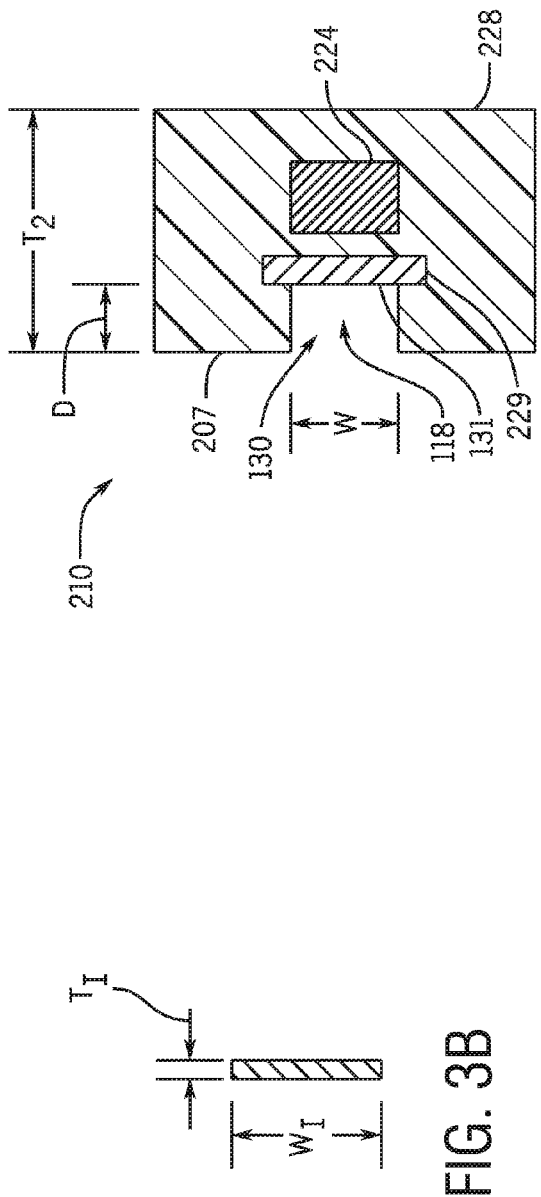

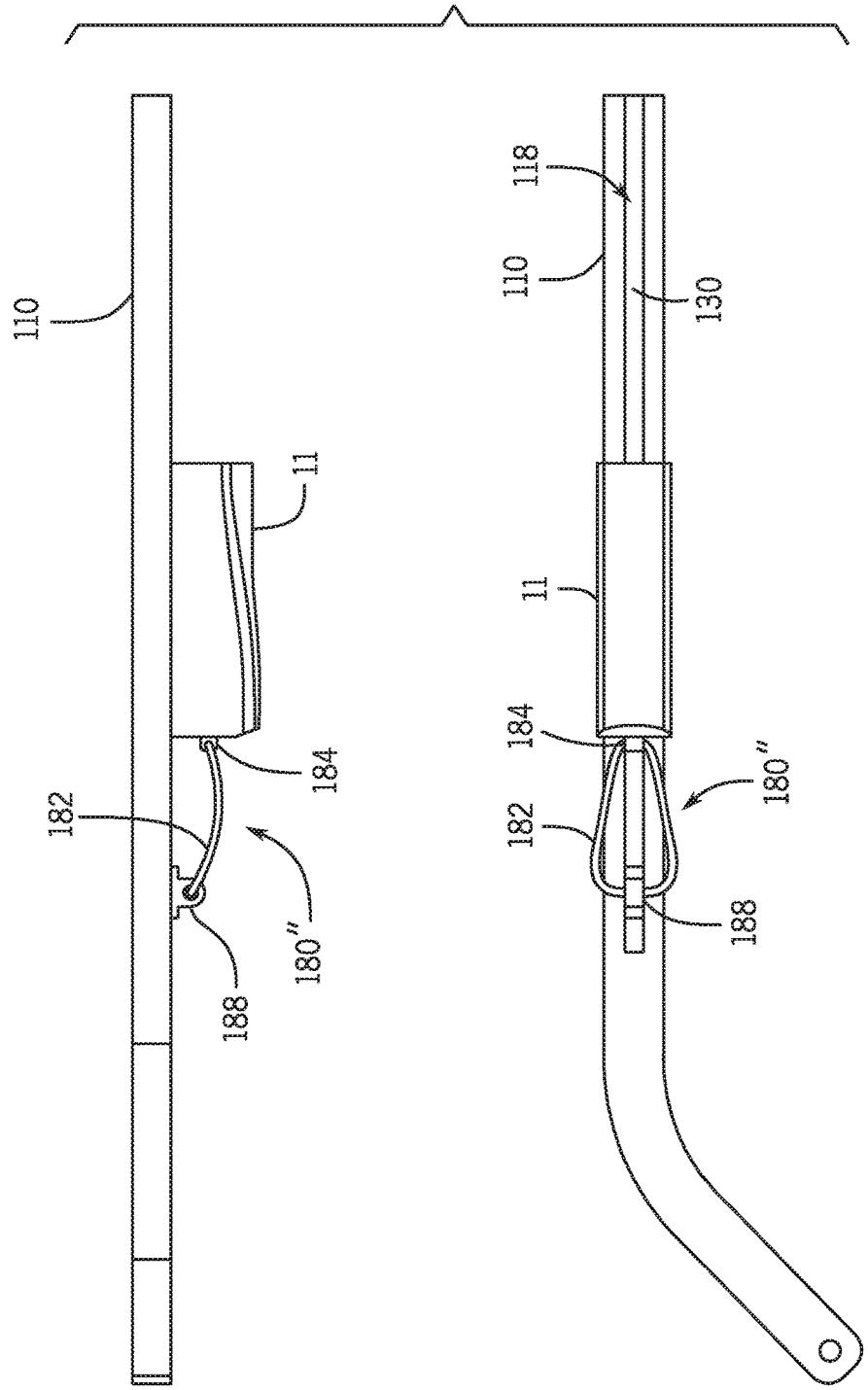

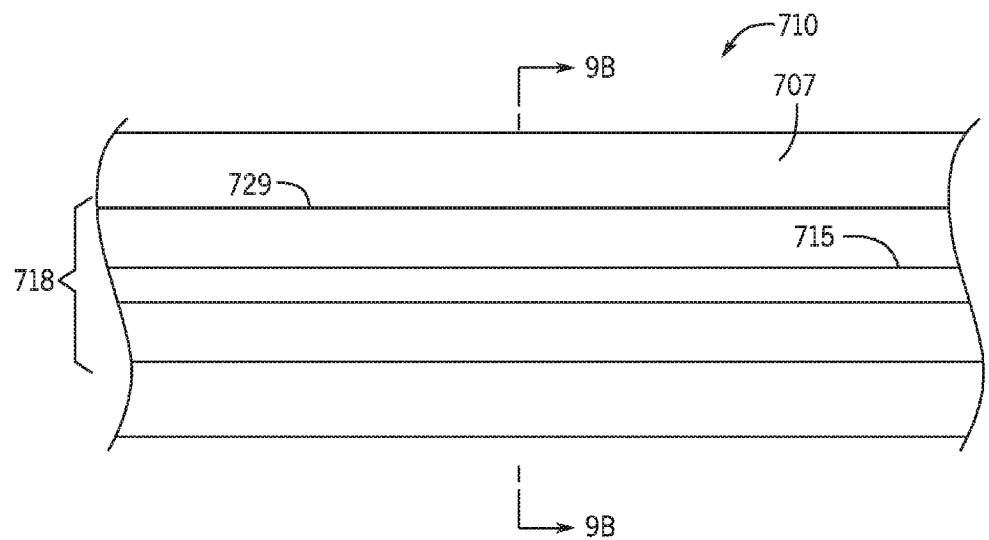
FIG. 9A
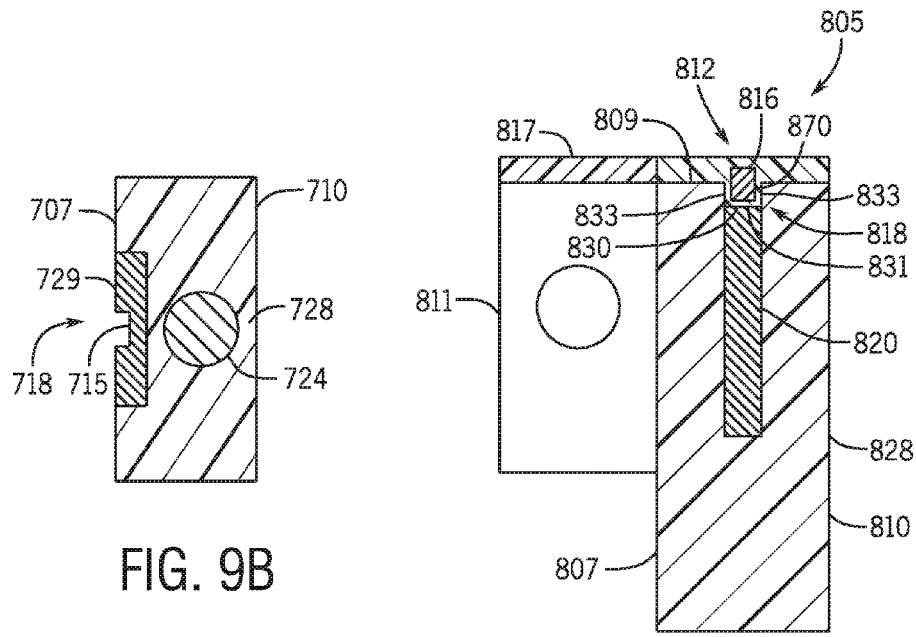
FIG. 9B
FIG. 10

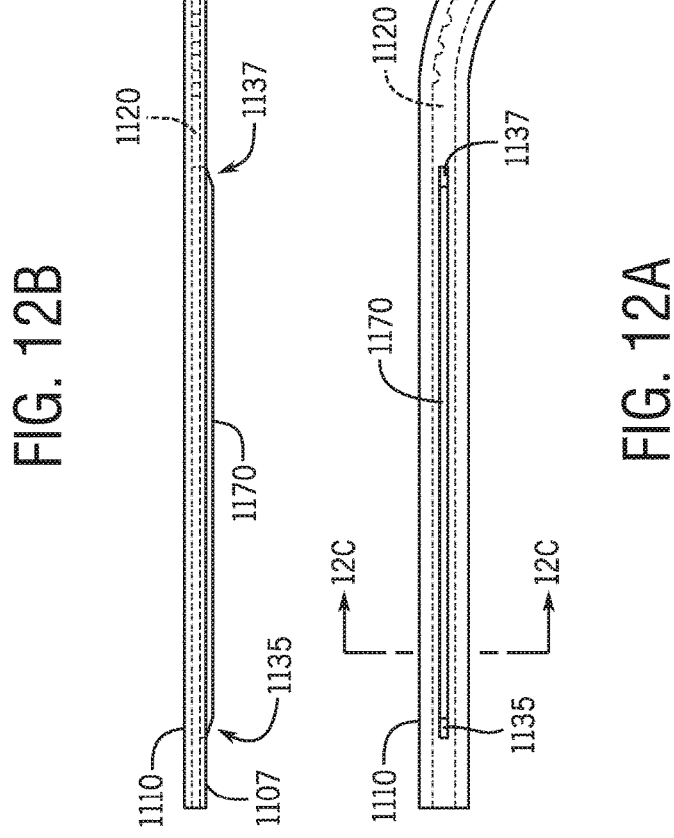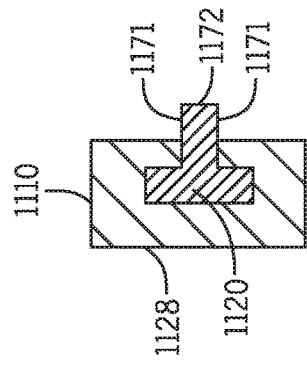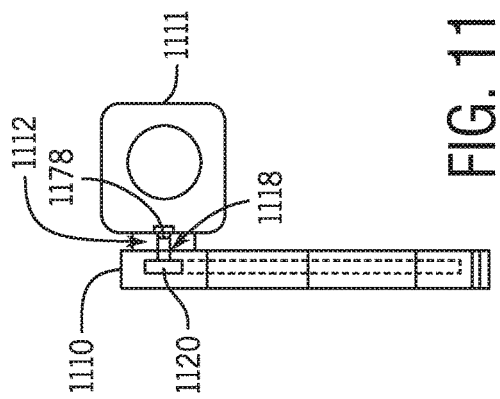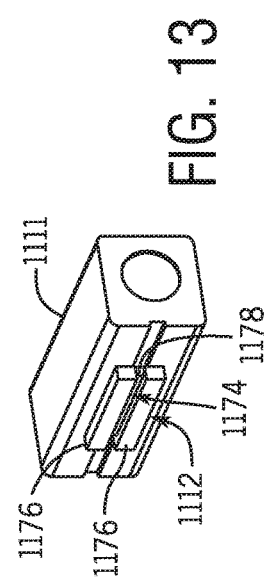

MAGNETIC ATTACHMENT MECHANISM FOR ELECTRONIC WEARABLE DEVICE

CROSS-REFERENCE TO RELATED APPLICATIONS

This application is a continuation-in-part of U.S. patent application Ser. No. 15/179,018 filed Jun. 10, 2016, now U.S. Pat. No. 10,241,351, which application claims priority to U.S. Provisional Application No. 62/173,741 entitled "ROBUST EYEWEAR TRACK, WIRELESS ENERGY TRANSFER SYSTEM AND ATTACHMENT MEANS FOR ELECTRONIC DEVICE", filed Jun. 10, 2015, U.S. Provisional Application No. 62/180,199 entitled "WIRELESS ENERGY TRANSFER CAMERA SYSTEM", filed Jun. 16, 2015, U.S. Provisional Application No. 62/186,341 entitled "WIRELESS ENERGY TRANSFER CAMERA SYSTEM", filed Jun. 29, 2015, U.S. Provisional Application No. 62/246,803 entitled "TEMPLE TRACK COMPRISING A MAGNET ATTRACTING MATERIAL", filed Oct. 27, 2015, U.S. Provisional Application No. 62/249,839 entitled "TEMPLE TRACK COMPRISING ELECTRONIC WEARABLE DEVICE AND A SAFETY CATCH", filed Nov. 2, 2015, U.S. Provisional Application No. 62/253,813 entitled "ENHANCED TEMPLE TRACK", filed Nov. 11, 2015, U.S. Provisional Application No. 62/289,488 entitled "INSTRUMENT AND METHOD TO MEASURE THE MAGNETIC ATTRACTION FOR EYEWEAR", filed Feb. 1, 2016, U.S. Provisional Application No. 62/306,331 entitled "EYEWEAR WITH ADVANCED TRACK", filed Mar. 10, 2016. The aforementioned applications are incorporated herein by reference in their entirety, for any purpose.

This application also claims the benefit under 35 U.S.C. 119 of the earlier filing date of U.S. Provisional Application No. 62/536,573 entitled "REFINED MAGNETIC BASE FOR WEARABLE DEVICE", filed Jul. 25, 2017. The aforementioned provisional application is hereby incorporated by reference in its entirety, for any purpose.

TECHNICAL FIELD

The present disclosure relates to eyewear systems, which may include eyewear with a magnetic track for attaching an electronic wearable device thereto.

BACKGROUND

The number and types of commercially available electronic wearable devices continues to expand. Forecasters are predicting that the electronic wearable devices market will more than quadruple in the next ten years. Some hurdles to realizing this growth remain. Two major hurdles are the cosmetics/aesthetics of existing electronic wearable devices and their limited battery life. Consumers typically desire electronic wearable devices to be small, less noticeable, and require less frequent charging. The smaller the electronic wearable device, the more challenging it may be to removably attach the device to a wearable article, such as eyewear and further solutions in this area may thus be desirable.

SUMMARY

An electronic wearable device according to some examples herein may include a device body including at least one electronic component, the device body having an attachment side configured to movably attach the electronic wearable device directly to an eyewear temple by magnetic attraction between the electronic wearable device and the eyewear temple, wherein a first magnet or ferromagnetic material is located on or within the electronic wearable device and a second magnet or ferromagnetic material is located within or on the eyewear temple, wherein the device body is positionable at a first position along a length of the eyewear temple and in a second position along the length of the eyewear temple while remaining attached to the eyewear temple, and wherein the first magnet or ferromagnetic material does not contact a surface of the second magnet or ferromagnetic material.

In some embodiments, the protrusion may be configured to a cooperating fit with an eyewear track. In some embodiments, the electronic wearable device may be a camera. In some embodiments, the electronic wearable device may be part of an eyewear system that includes the device and the eyewear. The eyewear may include a temple with an insert and a base of the track may be defined, at least in part, by the insert. In some embodiments, the electronic wearable device may be removably attachable to any of a plurality of different types of wearable articles other than eyewear. In some embodiments, the electronic wearable device may be part of a system including the device and the wearable article, which may any one of a hat, a facemask, a necklace, a ring, a helmet, or an accessory.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

Features, aspects and attendant advantages of the present invention will become apparent from the following detailed description of various embodiments, including the best mode presently contemplated of practicing the invention, when taken in conjunction with the accompanying drawings, in which:

FIGS. 3A and 3B show a side and cross-sectional views of an insert in according to an embodiment of the present disclosure;

FIG. 4A shows a transverse cross-sectional view of a temple of an eyewear system according to another embodiment;

FIGS. 5A-5C shows eyewear systems according to further embodiments;

FIGS. 9A and 9B show partial side and cross-sectional views of a temple according to yet another embodiment;

FIG. 10 shows a simplified cross-sectional view of a temple and electronic wearable device attached to the temple according to yet another embodiment;

FIG. 11 shows a view of an eyewear system according to a further embodiment;

FIGS. 12A-12C show views of a temple of the eyewear in FIG. 11;

FIG. 13 shows a view of an exemplary electronic wearable device in the form of a camera which includes a device guide in accordance with some examples herein;

DETAILED DESCRIPTION

The present application describes eyewear system which may include eyewear to which an electronic wearable device, such as a wearable camera, may be movably (e.g., slidably) attached. In some examples, the electronic wearable device may be removably attached to the eyewear. To that end, the eyewear may be provided with a guide for engagement with the electronic wearable device. The guide may be configured to restrict movement of the electronic wearable device in one or more directions. In some examples, the guide may steer the electronic device along a predetermined direction. The guide may be provided on the temple of the eyewear and may be referred to as temple guide. In some examples, the guide may be in the form of a magnetic track, which may be provided on a temple of the eyewear, and may also be referred to as temple track. The guide may be oriented along the length of the temple such that the electronic wearable device may be movable (e.g., slidable) between a forward position and an aft position along the length of the temple. The guide may be configured to restrict movement of the electronic wearable device in directions other than the direction defined between the forward and aft positions (e.g., longitudinal direction). The electronic wearable device may be removable from the guide for example by movement of the electronic wearable device in a direction substantially perpendicular to the longitudinal directions. The electronic wearable device, for example a camera, may include a device guide which is configured for cooperating fit with the guide on the eyewear (e.g., a temple guide). For examples, the device guide may be a male guide and the temple guide may be a female guide. In other examples, the device guide may be a female guide and the temple guide may be a male guide.

In some examples, the guide may be integral with the temple, e.g., not removable from the temple in the normal course of use of the eyewear. In other examples, the guide may be removably attached to the temple. For example, the guide may be incorporated into a guide adapter configured to engage the electronic wearable device. The guide adapter may be a universal adapter in that it may be configured for mounting to a variety of differently shaped pre-existing eyewear. In this manner, the guide adapter may enable pre-existing eyewear to be retrofitted for engagement with an electronic wearable device in accordance with the examples herein.

Figure 1:
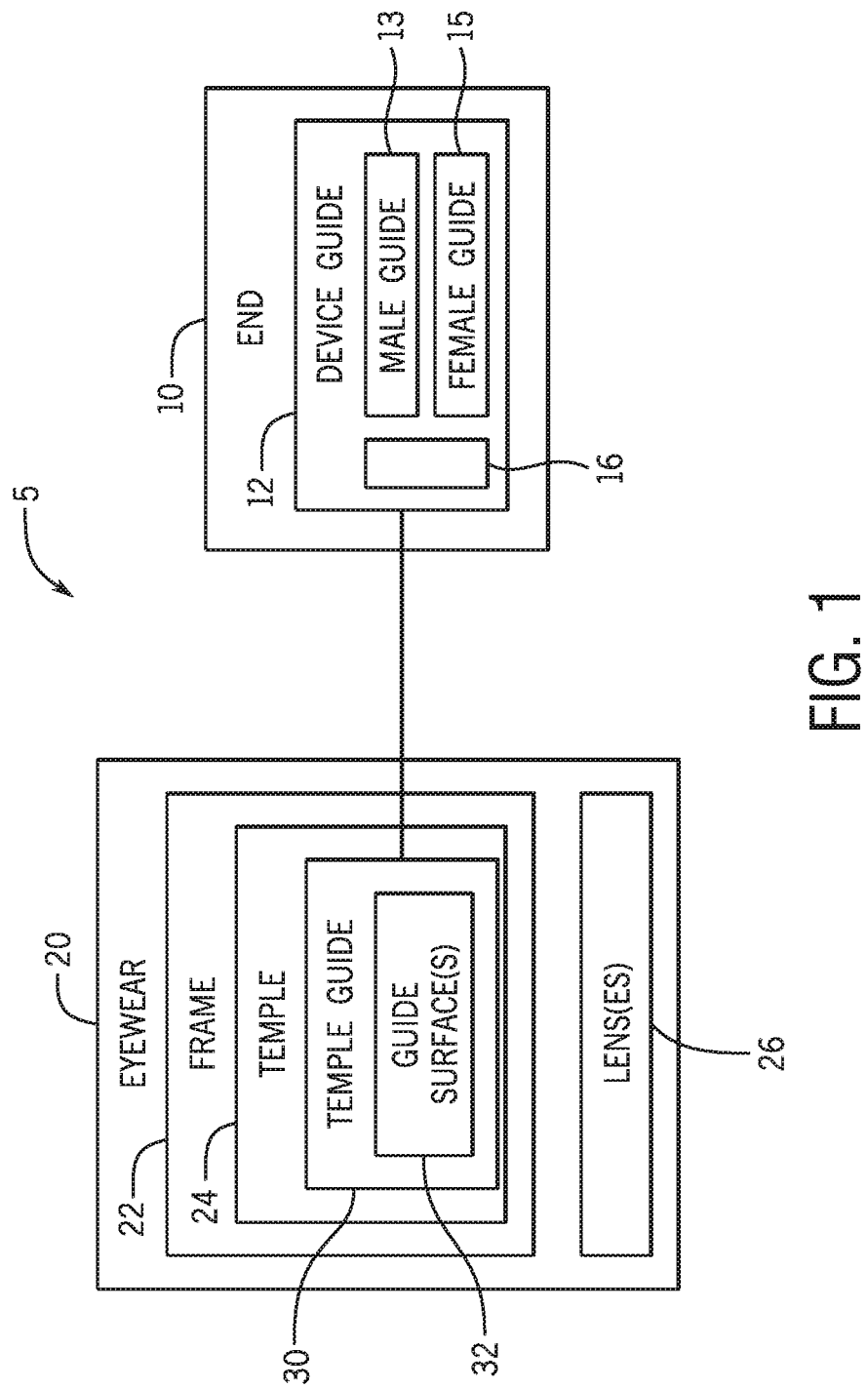
FIG. 1 shows a block diagram of an eyewear system in accordance with the present disclosure.

FIG. 1 shows a block diagram of an eyewear system 5, which includes eyewear 20 and an electronic wearable device 10 attached to the eyewear 20. An eyewear frame 22 of the eyewear 20 includes at least one temple 24. Typically, the eyewear frame 22 may include two temples, a left and a right temple configured for placement over a left and a right ear, respectively, of a user when the eyewear frame 22 is worn. The eyewear also typically includes at least one lens or a pair of lenses configured to be provided in the field of view of the user when the eyewear frame 22 is worn.

A guide 30 is provided on the temple 24, also referred to as temple guide, for engaging with a guide 12 (e.g., male guide 13, female guide 15) provided on the electronic wearable device 10, also referred to as device guide. The temple guide 30 and device guide 12 are configured to slidably engage such that the electronic wearable device may be retained in slidable attachment with the temple 24. The temple guide 30 may be configured to guide movement of the electronic wearable device 10 along a sliding direction. In accordance with the examples herein, the temple guide 30 and device guide 12 may be configured to attach magnetically. In some examples, the device guide 12 may include one or more magnets 16. In some examples, the one or more magnets 16 may include a neodymium-type magnet, a permanent magnet, or magnet(s) comprised of ferromagnetic material. The magnet(s) 16 may be of any shape, for example an elongate magnet (e.g., a bar magnet), one or more round magnets (e.g., circular or oval magnet(s)), or other. The guide 30 may include a guide surface 32, which is configured for magnetic attraction with the device guide 12. In some examples, the guide surface 32 may be defined by a ferromagnetic material of the temple such that the guide 30 may magnetically retain the electronic wearable device 10.

The guides 30 and 12 may be configured such that relative lateral movement of the electronic wearable device 10 is restricted when the electronic wearable device 10 is engaged with the temple guide 30. That is, the guides 30 and 12 may be configured such that movement of the electronic wearable device 10 in one or more directions other than the sliding direction is constrained.

Figure 2A:
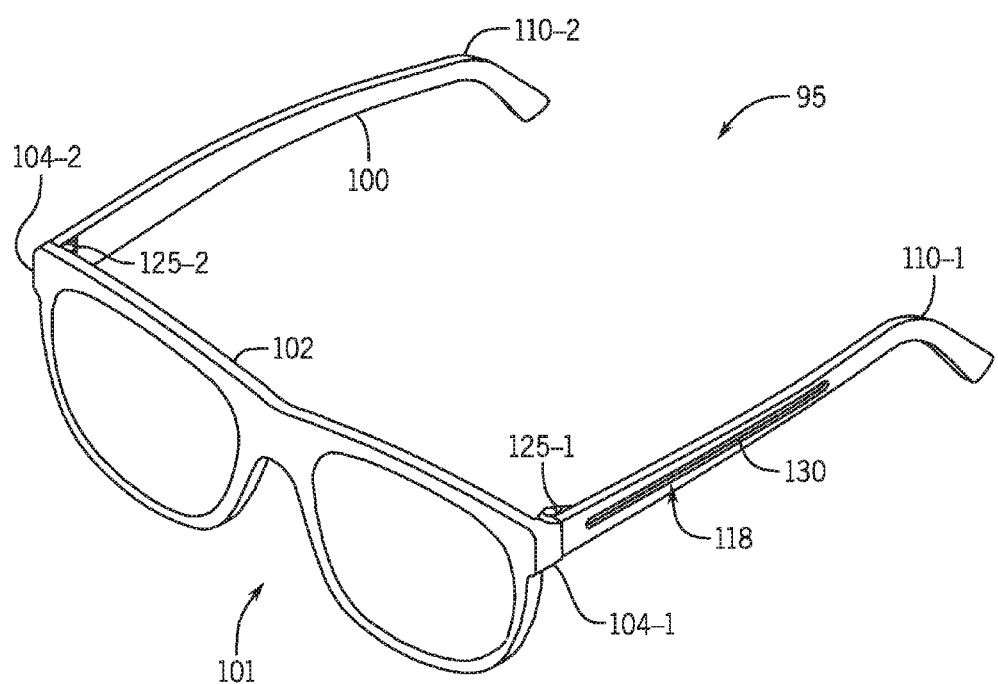
FIGS. 2A-2D show isometric, top, side, and transverse cross-sectional views of an eyewear system according to a first embodiment.
Figure 2B:
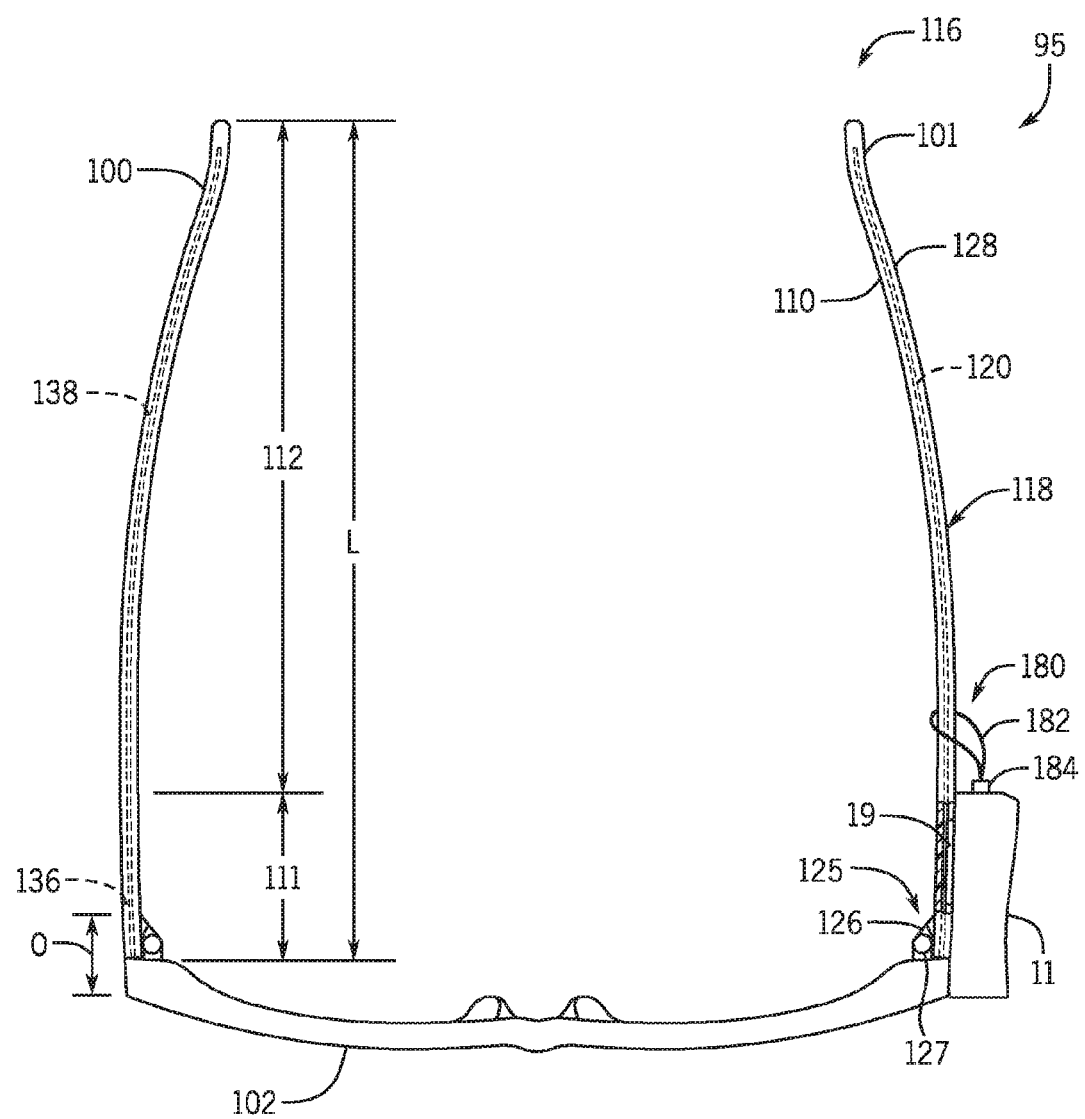

FIGS. 2A-2D show isometric, top or plan, side, and transverse cross-sectional views of components of an eyewear system according to a first embodiment. Components of the eyewear system 95 may be used to implement components of the eyewear system 5 in FIG. 1. For example, the electronic wearable device 10 of FIG. 1 may be a camera 11 as illustrated in FIG. 2B, although the present disclosure is not limited only to a camera for the electronic wearable device, as will be further described.

In the embodiment in FIGS. 2A-2D, the eyewear 100 includes a frame 101 configured to retain one or more lenses (e.g., prescription lenses, tinted lenses, shatter-resistant or ballistic lenses, combinations thereof or other types of lenses). The frame 101 includes a lens-retaining portion 102 which includes first and second end portions 104-1, 104-2 disposed at opposite ends of the lens-retaining portion 102. The frame 101 further includes a pair of temples 110 including first temple 110-1 (e.g., left temple) and second temple 110-2 (e.g., right temple). The first temple 110-1 is attached to the first end portion 104-1 and the second temple 110-2 is attached to the second end portion 104-2. The eyewear 100 may be provided in an unfolded configuration as illustrated in FIGS. 2A and 2B, e.g., as may be suitable when the eyewear 100 is worn. The temples 110-1, 110-2 are pivotally attached to the end portions 104-1, 104-2. In the illustrated example, each of the temples 110-1, 110-2 includes a hinge portion 125 (e.g., left and right hinge portions 125-1, 125-2, respectively), and the temples 110 are each attached to the lens-retaining portion 102 via their respective hinge portions 125-1, 125-2. In other examples, the temples 110 may be pivotally attached to the lens-retaining portion using any other type of flexure (e.g., a living hinge), which may enable the frame 101 to be provided in a folded configuration when not worn.

The eyewear 100 may include a guide 118 for attaching an electronic wearable device (e.g., camera 11) to the eyewear. The guide 118 may be configured to magnetically retain the electronic wearable device (e.g., camera 11) in attachment with the eyewear 100. In some examples, the electronic wearable device (e.g., camera) may be implemented in accordance with any of the examples in U.S. patent application Ser. No. 14/757,753 filed Dec. 23, 2015, and titled "Wireless Camera Systems and Methods", which application is incorporated by reference herein in its entirety for any purpose. The guide 118 may be configured to magnetically retain the electronic wearable device (e.g., camera 11) in attachment with the eyewear 100. The guide 118 may be configured to retain the electronic wearable device in slidable attachment with the eyewear 100. In other words, the electronic wearable device may be slidable or movable along a length of the guide while remaining in attachment with the eyewear 100. The guide 118 may be configured to restrict movement of the electronic wearable device in one or more directions with respect to the part of the frame to which the electronic wearable device is attached. The guide 118 may be integrally formed with the frame 101 or may be irremovably attached (e.g., welded, bolted, bonded, etc.) to the frame 101. In some examples, the guide may be removably attachable to the frame such as to enable removal of the guide from the frame during normal course of use. The guide 118 may be provided on the temple 110 and may thus be interchangeably referred to as temple guide 118. The temple guide 118 may be used to implement the temple guide 30 in FIG. 1. In some examples, a temple guide 118 may be provided on one or both of the temples 110-1, 110-2.

Figure 4B:
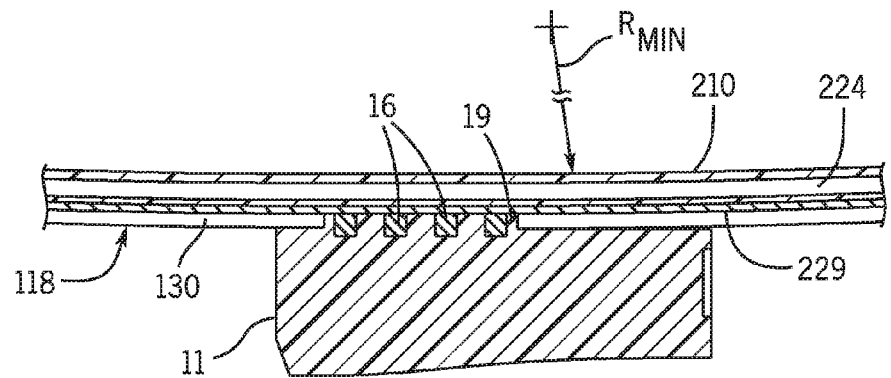
FIG. 4B shows a partial plan cross-sectional view of the temple in FIG. 4A and an electronic wearable device attached thereto.

The eyewear system 95 may include an electronic wearable device (e.g., camera 11) which is configured to attach and detach from the temple guide. The electronic wearable device (e.g., camera 11) may include a device guide (e.g., camera guide 19 as shown for example in FIG. 2B) which may be configured to engage the guide 118 of eyewear 100. Further aspects of the device guide will be described with reference to camera guide 19 but it will be understood that these aspects may apply to device guides on different types of electronic devices. The camera guide 19 is shaped for slidable engagement with the temple guide 118 of the eyewear 100. The camera guide 19 in this example is a male guide in the form of a protrusion attached to or integrally formed with the housing. The camera guide is configured to be inserted into a female guide (e.g., track 130) on the temple along a direction perpendicular to the base of the track. The camera guide 19 includes at least one magnet 16, e.g., as shown in FIG. 4B, which illustrates further details of the camera 11. The one or more magnets can be a rare earth neodymium type magnet or other type of magnet. In the illustrated example, the magnets are cylindrical (e.g., disc) magnets however other shapes and configurations may be used. Any number of magnets, for example one to six magnets, may be used to provide sufficient force to retain the camera on the temple. The force of attraction between the magnets and ferromagnetic material of the guide surface, which can be defined based on a measured force required to pull the magnet off the magnet attracting surface (i.e., a pull force), may be tailored to provide enough force to maintain the camera in attachment with the temple without inhibiting the sliding of the magnet or otherwise affecting the optics of the eyewear. That is, the pull force may be sufficiently high to keep the camera attached to the temple while sliding yet low enough so as not to inhibit the movement of the camera and also to ensure that the temple is not significantly deflected which may affect the optical performance of the eyewear and/or result in damage. In some examples, the pull force may range from about 0.5 Newtons to about 10 Newtons. In some examples, the pull force may range from about 1.5 Newtons to about 5 Newtons. That is, the magnet(s) may be attracted to the ferromagnetic material of the temple by a force within the range of about 1.5 Newtons to about 5 Newtons. In some examples, the pull force may be less than 0.5 Newtons or exceed 10 Newtons.

The number and size of magnets may be tailored. A relevant magnet property that may be taken into consideration is the maximum pull force. Also, pole orientation, magnetic direction, field shape and other properties of the magnets may be considered when tailoring the magnet configuration in the device guide. Also, although the examples herein describe temple guide and device guide that include a magnetic material and a magnet, respectively, it will be understood that this arrangement may be reversed, e.g., the magnet may be provided on the temple and the ferromagnetic material may be provided on the electronic wearable device.

Figure 17A:
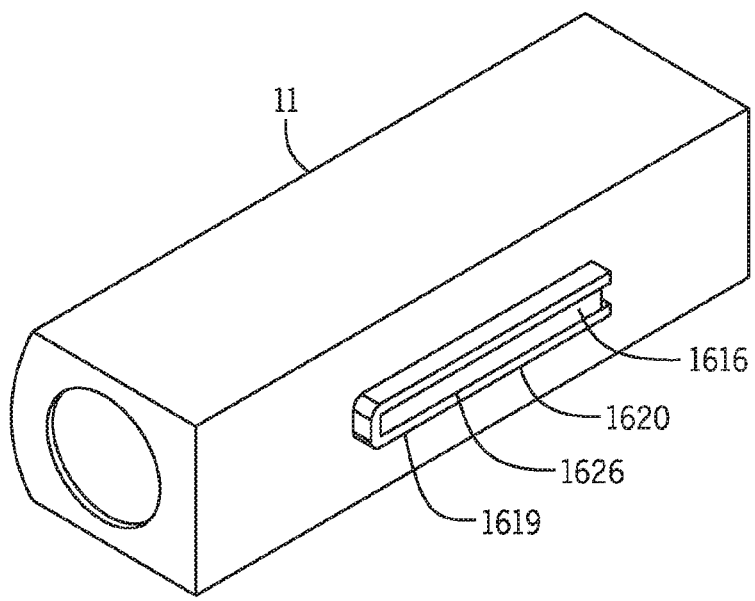
FIGS. 17A-17C show views of a camera with a device guide in accordance with an embodiment of the present disclosure.
Figure 17B:
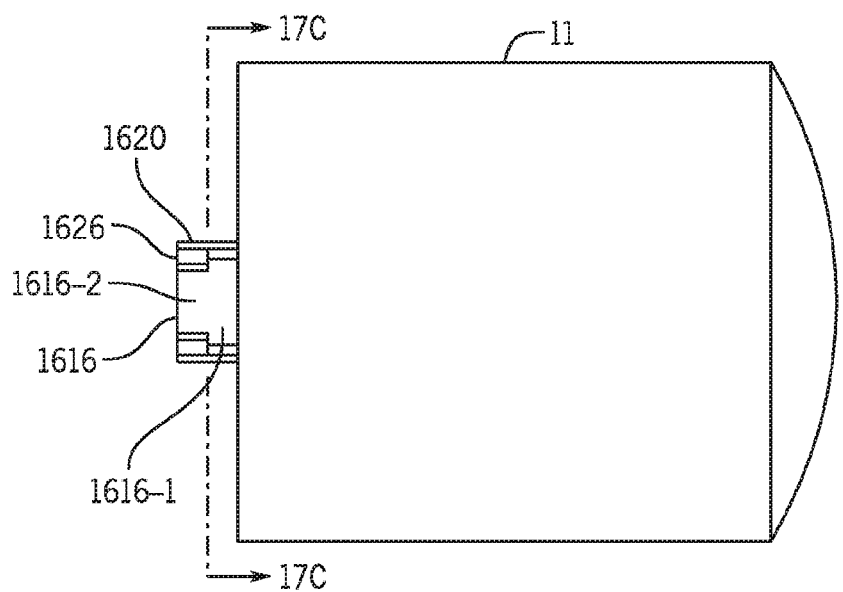
Figure 17C:
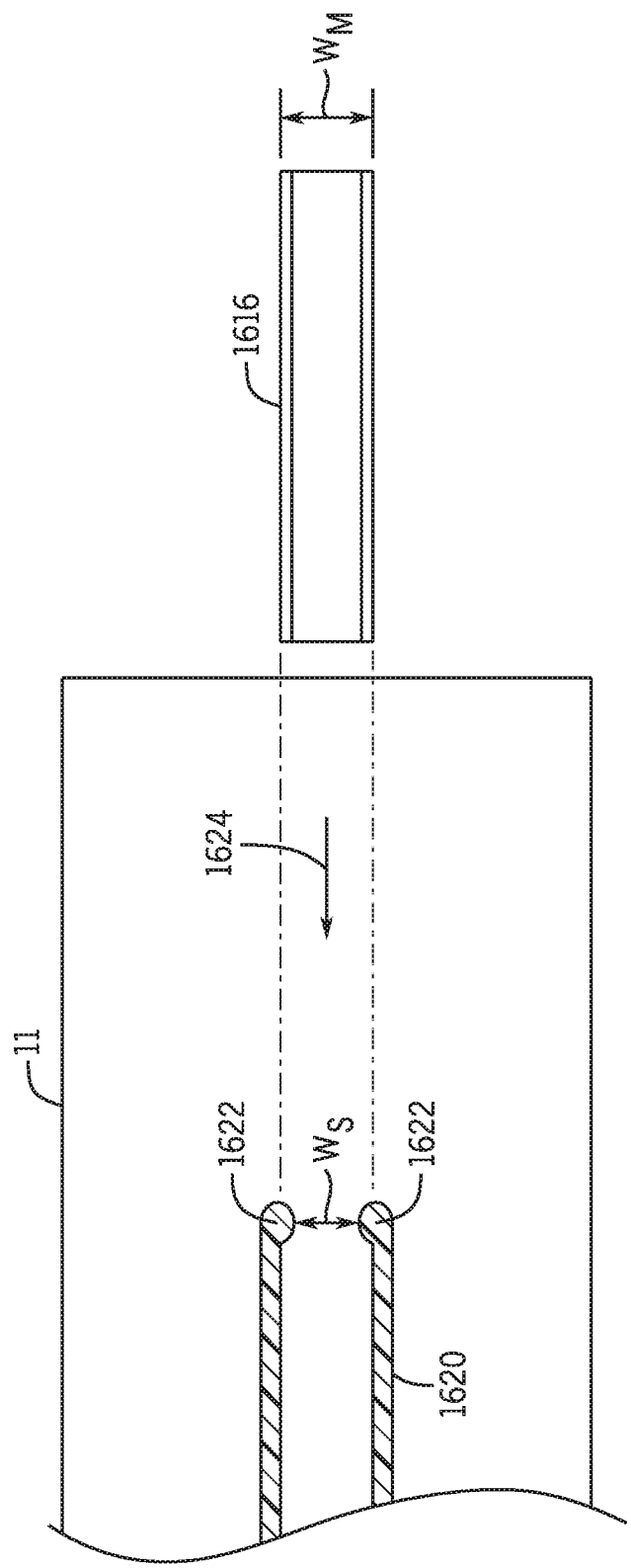
Figure 18A:
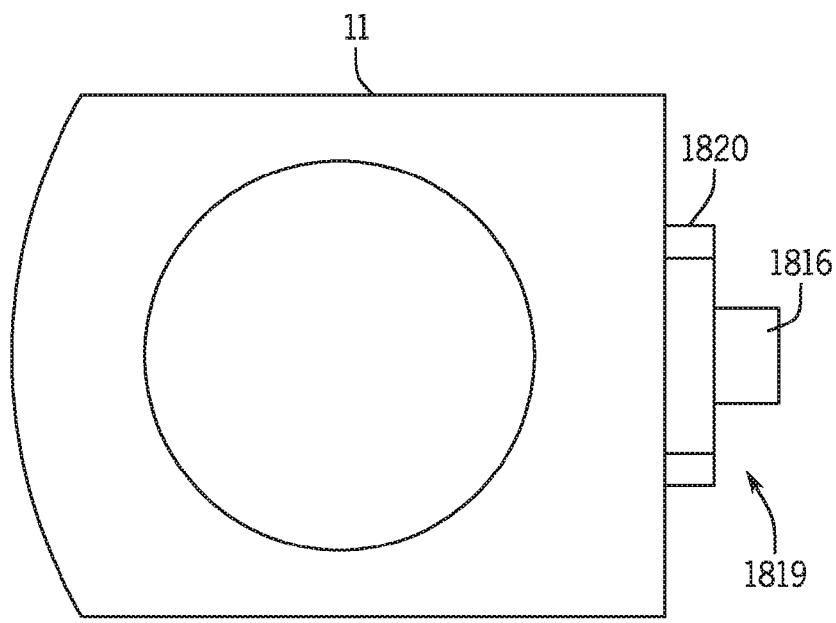
FIGS. 18A and 18B show views of a camera with a device guide in accordance with another embodiment of the present disclosure.
Figure 18B:
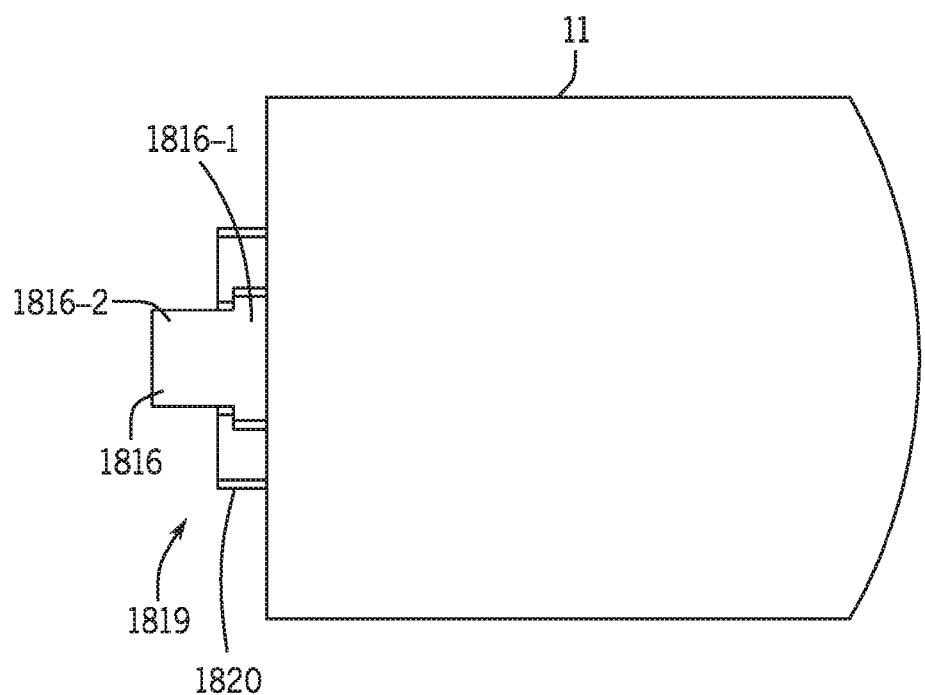
Figure 19:
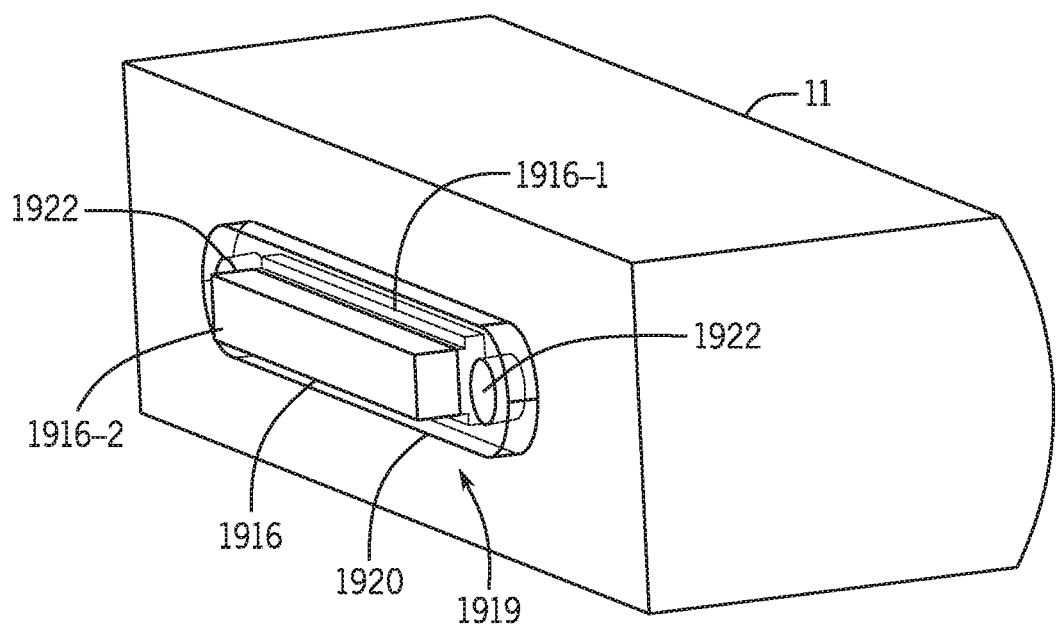
FIG. 19 shows a view of a camera with a device guide in accordance with an embodiment of the present disclosure.

In some examples one or more bar magnets may be used, e.g., as in the examples shown in FIGS. 17-19. In the embodiment in FIGS. 17A-17C, the camera 11 includes a camera guide 1619, which includes custom shaped bar magnet 1616. The bar magnet 1616 is T-shaped with the exposed side of the magnet being narrower than the side that closer to the camera body. That, is the magnet 1616 includes a wider bottom portion 1616-1 and a narrower top portion 1616-2. In one non-limiting embodiment, the magnet has a height of about 1.5 mm a width at the narrow portion of about 2.0 mm and a length of about 12 mm. Other dimensions may be used as may be desired for a particular configuration of a device guide and corresponding temple guide. The slotted protrusion 1620 is similarly shaped having the width of the slot being wider at the bottom (e.g., closer to the camera body) and narrower at the top. This arrangement mechanically retains the magnet within slotted protrusion 1620 such as when magnetic force is experienced due to attraction with the temple guide. During assembly, the magnet 1616 is inserted into the slotted protrusion 1620 to form the camera guide 1619. In some examples, the magnet 1616 may be additionally attached to the camera 11 for example using an adhesive or other conventional fastening technique. In other embodiments, the magnet may not be adhered to the camera but may instead be retained in the slot via a snap feature. As shown in cross-section in FIG. 17C, the walls of the slotted protrusion 1620 may include a lip 1622 at the open end (e.g., insertion end) of the slotted protrusion 1620. The width of the slot at the lip $W_S$ may be slightly less the width of the magnet $W_M$ such that the lip 1622 is temporarily deformed during insertion of the magnet, such as along direction 1624, and then returns to its nominal shape to retain the magnet in the slot. In some examples, the exposed surface of the magnet may be flush (e.g., in plane) with the bottom surface 1626 of the protrusion, as shown in FIG. 17B. In other examples, as described herein, the magnet may be recessed from the bottom surface 1626 of the protrusion.

FIGS. 18A and 18B show another embodiment of a camera 11 with a device guide 1819, which is in the form of a male guide. The device guide 1819 includes a T-shaped bar magnet 1816 similar to the bar magnet 1616 of the example in FIGS. 17A-17C. The wider bottom portion 1816-1 is retained in a slotted protrusion 1820, which is shorter in height than the magnet 1816. As such, the upper narrower upper portion 1816-2 is fully exposed and functions as the portion that is inserted into the temple guide. In other words, the height of the exposed magnet portion (e.g., upper portion 1816-2) is substantially the same as the depth D of the track and the width of the exposed magnet portion (e.g., upper portion 1816-2) is substantially the same as the width W of the track. The magnet 1816 may be similarly retained in the slot of the protrusion 1820, e.g., by a lip portion. In other examples, the magnet 1816 may be additionally or alternatively attached to the camera by an adhesive or other means.

FIG. 19 shows yet another embodiment of a camera 11 with a device guide 1919 in the form of a male guide. A portion of the device guide 1919, namely the exposed portion of the magnet 1916 is configured for insertion into a temple track. Similar to the magnet 1816 of the previous example, the magnet 1916 includes a wider lower portion 1916-1 and a narrower upper portion 1916-2. The lower portion 1916-1 is enclosed by the retention plate 1920, which acts to attach the magnet 1916 to the camera 11. The upper portion 1916-2 is exposed and similarly configured as upper portion 1816-2 to function as the portion that is inserted into the temple guide. The retention plate 1920 may be laser welded to the camera via the bosses 1922 or otherwise attached such as with conventional fasteners (e.g., bolts, rivets, snap features, etc.).

Figure 2C:
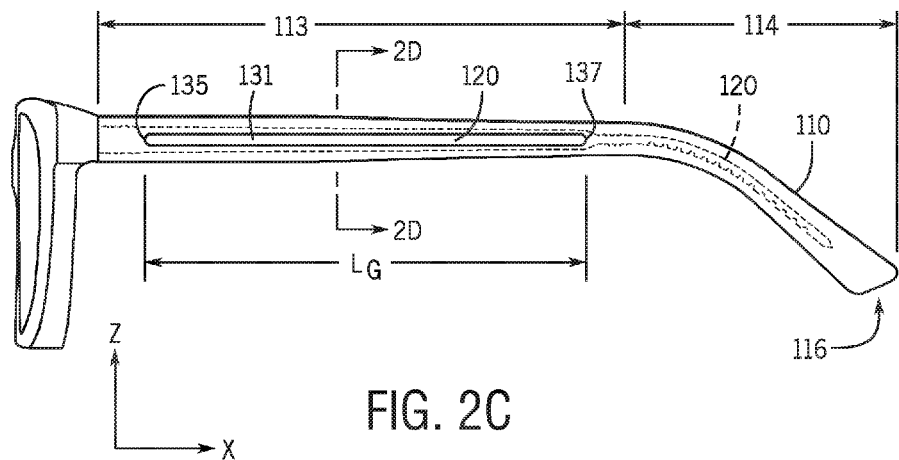
Figure 2D:
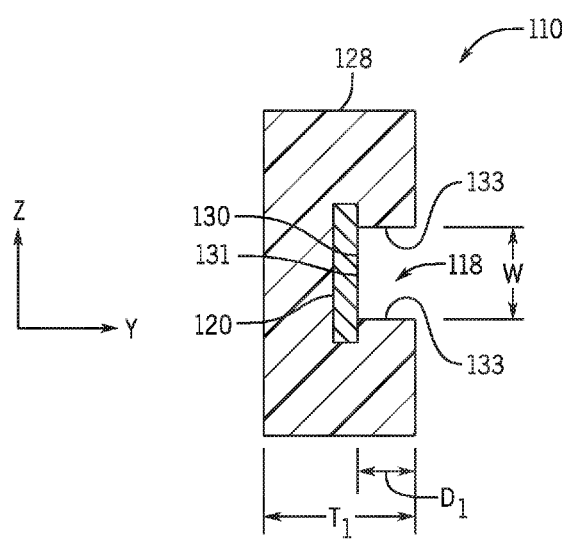

Referring now back to FIGS. 2B-2D, the temples 110 may each include an insert 120. The insert 120 may be a metal insert (also referred to as core wire or stiffener), which may function to structurally reinforce the temple 110. In the embodiment in FIGS. 2A-2D, the insert 120 is formed of a ferromagnetic material, such as spring steel, stainless steel (e.g., AISI 420), or combinations thereof. In other examples, the insert may comprise AISI 301 steel, series 400 stainless steel, ferritic stainless steel, martensitic stainless steel, duplex stainless steel. In some examples, the ferromagnetic material may have magnetic permeability in the range of 1.3-700. In some examples, ferromagnetic material may have magnetic permeability in greater than 700. The insert 120 may be enclosed or substantially enclosed by a second material 128 (also referred to as outer material) to form the temple 110. The second material 128 may be different from the material from which the insert is formed. For example, the second material 128 may be plastic, such as an injection molded plastic or acetate. In some examples, the second material 128 may be metal, e.g., a different metal than that of the insert, such as a non-ferromagnetic metal. The insert 120 may extend from a hinge portion 125 towards a distal end 116 of the temple 110. In some examples, the insert 120 may be connected to the hinge portion 125. For example, the temple 110 may include a hinge barrel 126, which is configured to receive a hinge pin 127 for pivotally securing the hinge portion 125 to the lens-retaining portion 102. In some examples, the hinge barrel 126 may be metal and may be rigidly connect to (e.g., welded to or integrally formed with) the insert 120. In other examples, the insert may not be connected to the hinge portion.

In some examples, the temple guide 118 may be implemented in the form of a female guide (e.g., a track 130). In other examples, the temple guide 118 may have a different shape or configuration. For example, the temple guide may be in the form of a male guide (e.g., a rail), examples of which will be described further with reference to FIGS. 11-13. The temple guide 118 may include one or more guide surfaces, e.g., base, sidewalls, top surface, or other depending on the configuration of the guide. In the embodiment in FIGS. 2A-2D, the temple guide 118 is implemented in the form of a track 130, which is defined by a groove formed in the second material 128. The track has a bottom surface or base 131 and sidewalls 133. The track has a width W defined by the distance between the sidewalls 133. The track terminates at a forward end 135 defined by a forward end wall 136 and an aft end 137 defined by an aft end wall 138. The track extends to a depth D, which exposes the insert 120. Thus, the insert 120 functions as both a stiffening member (e.g., core wire) for the temple and also provides a ferromagnetic base for the track 130 for magnetically attaching an electronic wearable device thereto. In some examples, the width W may be constant along the length $L_G$ of the guide. In other examples, the track may taper (e.g., the width W may narrow) towards the forward end 135, the aft end 137, or both. In some examples the track may be have an open forward end and/or an open aft end and the taper may prevent the electronic wearable device from sliding out of the track. In some examples, the width W may be constant along the depth D, the track thereby having a generally rectangular cross section. In such examples, the electronic wearable device (e.g., camera 11) may be attachable and removable from the track 130 by insertion of the device guide (e.g., camera guide 19) into the track 130 along a direction perpendicular to the base 131 (e.g., a direction parallel with the Y direction).

In specific exemplary but non-limiting embodiments, the width of the track may not exceed 2.5 mm (e.g., the width W is about 2 mm), the depth of the track may not exceed 1.5 mm (e.g., the depth D is about 1.25 mm), the forward end of the track may be located from about 5 mm to about 20 mm distally from the hinge portion, plus or minus engineering tolerances (e.g., plus or minus 10-15% of the specified dimension based on the appropriate tolerances) and the track spans between about 45% to about 85% of the length L of the temple. In some embodiments, the length of the track may be less than 45% or greater than 85% the length of the temple.

Embodiments of the present invention may be implemented in temples having a variety of shapes and size, for example temples having a relatively simple profile or the temples that contoured in one or more directions. For example, as illustrated in FIGS. 2A-2C, the temple 110 may follow a curved profile viewed in plan. That is, the temple 110 may include a generally flat portion 111 and a contoured portion 112. The flat portion 111 may extend from the hinge portion 125 to about ¼ or ⅓ of the length L of the temple, although in other examples the flat portion 111 may be shorter than ¼ of the length L of the temple or longer than a ⅓ of the length L of the temple. The contoured portion 112 may extend from the flat portion 111 to the distal end 116. The contoured portion 112 may define a generally simple curve (e.g., a C-shaped curve) or a more complex curve (e.g., an S-shaped curve, in which the contoured portion curves in one direction and then flattens out or curves in an opposite direction as you move towards the distal end). In some examples, as in the embodiment in FIGS. 1-4, the guide 118 extends at least partially along both of the flat and contoured portions 111 and 112. In such examples, the guide follows the curvature of the temple. In such examples, the curvature (e.g., minimum temple radius $R_{MIN}$, see e.g., FIG. 4B) may be selected to ensure that device guide remains in engagement with the temple guide along the full length of the temple guide. In some examples, the minimum temple radius may be about 90 cm. In other examples, the temple, when viewed in plan, may be contoured along substantially all of the length of the temple and may not include a flat portion 111, and the curvature may be such as to ensure that the device remain in engagement with the temple guide when moved along the length of the temple guide. In yet further examples, the temple, when viewed in plan, may be generally flat along substantially the full length of the temple. In some examples, the temple guide may span only a generally flat portion of the temple (such as in the embodiments in FIGS. 14-15).

When viewed from the side (see e.g., FIG. 2C), the temple 110 may include an arm portion 113 and an earpiece portion 114. The arm portion 113 may extend generally straight aft from the hinge portion 125 towards the distal end 116 of the temple. The arm portion 113 may span more than half (e.g., 60%, 70%, 75%, 80% or other) of the length L of the temple 110. In some examples, the arm portion 113 may include part or all of the flat portion 111 and at least part of the contoured portion 112. The earpiece portion 114 may extend from a bend, which is positionable over the wearer's ear to the distal end 116 of the temple. The earpiece portion 114 may curve downward such that the distal end 116 of the temple is positionable behind the ear of the user, e.g., to secure the temples to the user's head when the eyewear is worn. In accordance with the examples herein, the guide 118 may span one or more of the above described portions of the temple 110. In some examples, the guide 118 may span most of the length of the arm portion 113 but may not extend along the earpiece portion 114. The guide 118 may therefore be generally straight along its longitudinal direction and may thereby restrict movement of the electronic wearable device along a straight path. In other examples, the guide 118 may extend along only a small portion (e.g., 50% or less) of the arm portion 113. In yet further examples, the guide 118 may extend at least partially along both of the arm and the earpiece portions 113 and 114, respectively, and the guide 118 may therefore guide the electronic wearable device along a curved path.

The temple and device guides may be configured such that the electronic wearable device is positionable substantially flush with a front face of the eyewear. For example, the forward end 135 of the track 130 may be spaced from a font face of the eyewear by an offset distance O (see e.g., FIG. 2B) substantially matching the distance between the forward face of the electronic wearable device and the forward end of the device guide.

In one specific embodiment the electronic device includes a plurality of cylindrical magnets (e.g., 1-6 magnets having a diameter of about ¹⁄₁₆ inches), each of which may be an NdFeB with Ni plating axially magnetized with 0.12 lbs pull force. The size and pull force of the magnets may be tailored taking into account the form factor of the electronic wearable device and the required force to maintain the electronic wearable device in magnetic attachment with the temple while still enabling the electronic wearable device to be slidable along the track. In some examples, the one or more magnets may be spaced from the base of the track by a gap when the electronic wearable device is attached to the track. In such examples, the magnetically attached electronic wearable device may essentially float over the surface of the track (e.g., the base 131) which may improve slidability of the electronic wearable device along the track and or reduce the risk of scratching the aesthetic surface of the eyewear. In some examples, the base 131 may be coated with an additional layer, which may be aesthetic or functional. For example, the base 131 may be coated with a friction reducing layer (e.g., a low-friction material such as TEFLON). In some examples, the base 131 may be coated with a corrosion resistant material. In some examples, the additional layer may be a layer or paint such as to paint the base in a color matching the color of the second material or to paint the base in an accent color. In some examples, the base 131 may be coated with a lacquer, paint, varnish or any other type of coating. In some examples, the base 131 may be plated with nickel, copper, zinc, gold, silver, or combinations thereof. In some examples, the coating on the base of a track may itself be the ferromagnetic material, which enables magnetic attraction between the electronic wearable device and the track. In some examples, the spacing between the track and the magnet(s) of the electronic wearable device may be achieved by configuring the depth of the track, the height of the guide or any enclosure around the magnet, or any combination thereof in such manner as to position the magnet in a spaced or distance-separated relationship to the base of the track and/or any other surfaces of the track, thereby reducing the risk of damage to surfaces of the track.

FIGS. 3A and 3B show an insert 220 prior to its assembly into a temple (e.g., temple 110). The insert 220 may be a generally flat elongate member, which may be formed for example by stamping a thin metal strip in the desired shape (e.g., as shown in FIG. 3B) from bulk material such as stainless or spring steel sheet metal. In some examples, the insert 220 may be generally flat along the entire length of the insert. The insert may be made from steel, stainless steel, for example steel alloy with minimum 10.5% chromium content by mass, or others. Different alloys of steel may be used and relevant properties to be considered in determining a suitable alloy may include level of hardness (e.g., martensitic microstructure) and nickel content. In some examples, the insert 220 or a portion thereof may be coated, for example a side of the insert that is exposed and provides a guide surface may be coated with a corrosion resistant material, a friction reducing material, a colored material such as paint which may be the same as the color of the other material or an accent color, or another type of coating. In some examples, the insert 220 may be so coated before assembly into the temple. In other examples, only the exposed portion of the insert 220 may be coated after the insert has been assembled into the temple.

The insert 220 may optionally include one or more grippers 221 configured to resist relative lengthwise movement between the insert 220 and the outer material enclosing the insert (e.g., second material 128). The grippers 221 may be implemented as textured portions, which may increase the friction between the insert 220 and the outer material. The grippers 221 may be located at one or more locations along the length of the insert 220, for example at a forward end and/or at an intermediate location along the length of insert 220. Grippers may be provided along any surface of the insert 220. The insert 220 may include a forward portion 223 and an aft portion 222. The forward portion 223 may have a length selected to substantially correspond to the length of a straight portion of the temple (e.g., straight portion 113). The aft portion 222 may have a length selected to substantially correspond to the length of a curved portion of the temple (e.g., curved portion 114). The forward portion 223 may be wider than the aft portion 222. The forward portion 223 may be wide enough to serve as a base of the track. In other words, the width $W_I$ of the forward portion 223 may be greater than the width W of the track 130. The width of the insert may range from about 2.5 mm to about 6 mm or greater and the thickness $T_I$ may range from about 0.3 mm to about 1 mm or greater depending on the geometry of the temple. In one specific non-limiting embodiment, the insert may have a width $W_I$ of about 4.8 mm and a thickness $T_I$ of about 0.6 mm. Other dimensions may of course be used in other embodiments. In an exemplary non-limiting embodiment, the width of the forward portion 223 may be from about 3.0 mm to about 5 mm, in some examples from about 3.5 mm to about 4.8 mm, although this width may be different depending on the particular temple design. The width of the aft portion 222 may be half or less of the width of the forward portion 223. The aft portion may include one or more notches 225 arranged along the lower side of the aft portion 222, an upper side of the aft portion 222, or along both sides of the aft portion 222. The notches 225 may enable the aft portion 222 to be more easily deformed to a shape corresponding to the curved portion of the temple (e.g., as shown in FIG. 2C), as well as enable further adjustments of the shape of the temple (e.g., a curvature of the curved portion) to fit a particular user.

The insert (e.g., core wire) may be attached (e.g., welded) to a hinge barrel inserted into a softened injection molded plastic temple. In other examples, a plastic temple may be insert molded around the core wire, with the temple being both shaped and attached to the core wire during the cooling/curing phase. In yet further examples, the insert may be embedded in an acetate laminate temple, which can then be shaped and polished to achieve its final aesthetic look. The optional grippers, particularly in cases in which the insert is not attached to the hinge, may improve the attachment between outer material and insert. In some examples, the track may be formed in the temple after the temple and core wire have been assembled, e.g., by cutting, such as by laser cutting, a slot in the plastic material to a depth that reaches the flat insert. In other examples, the track may be initially formed during the molding process, e.g., by using a mold or additional/removable inserts to define the shape of the track during the molding process.

In some examples, the eyewear system may include a safety catch 180. The safety catch 180 may be configured to prevent separation of the electronic wearable device (e.g., camera 11) from the eyewear 100 in the event that the electronic wearable device becomes inadvertently disengaged from the guide 118. The safety catch 180 may include a strap 182 (e.g., a securing ring, a lanyard, or another), which is secured to the electronic wearable device (e.g., camera 11) and the eyewear frame 101. In some examples, the strap 182 may be made from plastic, for example a flexible plastic material. In some examples, the strap 182 may be a securing ring, which encircles a cross section of the temple 110. The securing ring may be made from translucent or transparent material. In other examples, the strap 182 may be the same color as the color of the temple. In some examples, the securing ring may have a cross sectional core thickness of less than 1.5 mm. In some examples, the strap 182 may be made from a monofilament strand or string of nylon, polyvinylidene fluoride (PVDF), polyethylene, DACRON, DYNEEMA, or others. In some examples, the strap 182 may be made from an elastic material such as rubber. For example, the strap 182 may be made from an elastomer such as silicon rubber. Other materials, such as natural fibers or synthetic materials may be used. The strap may be made from metal (e.g., single or multi-strand wire, a chain, or others). The strap 182 may be attached to a securing feature 184 provided on the electronic wearable device. Other configurations may be used for the safety catch, examples of some of which are further described below with reference to FIGS. 5A-5C.

Referring now to FIGS. 4A and 4B, partial cross-sectional views of eyewear system in accordance with another embodiment are shown. The temple 210 includes a temple guide 118 in the form of a track 230 provided on an outside side 207 of the temple 210. The temple 210 may include an insert 224 (e.g., a core wire), which increases the stiffness of the temple 210. The insert 224 need not be ferromagnetic as the insert in this embodiment does not form part of the magnetic track. In this embodiment, the temple additionally includes a strip 229 made from ferromagnetic material (also referred to as metal strip) arranged at the base 131 of the temple guide 118. The strip 229 may be provided by depositing a layer of metallic material onto a surface of the temple (e.g., along the base of the slot that defines the track) or by attaching (e.g., by bonding) a separate metallic strip to the base of the track. The strip 229 may facilitate the magnetic attraction between the temple guide 118 and a guide of an electronic wearable device. The strip 229 may be spaced from the insert 224. The depth $D_2$ of the track 230 may be substantially the same in the embodiment in FIG. 2A, although a thickness $T_2$ of the temple 210 in this second embodiment may be greater than the thickness $T_1$ of the temple 110 in the first embodiment where the insert provides the functionality of both a stiffening core wire and a magnetic base of the track 230. In some examples, the insert may be omitted. In some examples, the depth $D_2$ of the track 230 may be up to about 1 mm. In such examples, the temple may be made substantially from a non-metallic material (e.g., injection-moldable plastic or acetate) except for a thin layer (e.g., a coating) of metallic material provided along the base of the track. Such a layer may not significantly increase the stiffness of the temple to act as a stiffener but would otherwise facilitate magnetic attraction between the temple guide 118 and a guide of an electronic wearable device.

FIG. 4B shows a partial plan cross-sectional view of the temple 210 and an exemplary electronic wearable device (e.g., camera 11) attached to the temple 210. The camera 11 includes a device guide 19, which is configured to be received, at least partially, within the track 230.

Figure 4C:
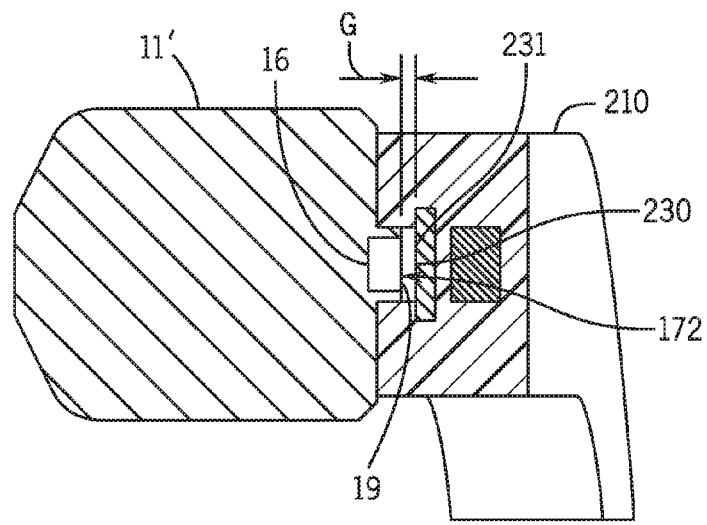
FIG. 4C shows a transverse plan cross-sectional view of a temple and electronic wearable device according to another embodiment.

FIG. 4C shows a partial cross-sectional view of a temple 310 and an exemplary electronic wearable device (e.g., camera 11') attached to the temple 210 in accordance with another embodiment. In this illustrated embodiment, the camera 11' includes a camera guide 19, which is configured to be received, at least partially, within the track 230. The track 230 includes a base 131 which is defined by a ferromagnetic material of the temple (e.g., an exposed surface of a ferromagnetic insert as in the example in FIG. 2D, or a ferromagnetic layer such as the strip 229 as in the example in FIG. 4A). The camera guide 19 in this example is a male guide (e.g., a protrusion 172). One or more magnets 16 are attached to the protrusion 172. The one or more magnets 16 may be attached to corresponding recesses in the protrusion 172. The one or more magnets may have an outer surface, which is exposed, or they may be embedded within the protrusion 172 such that the surfaces of the magnets are not exposed. In some examples, the magnets may be flush with the outermost surface of the protrusion and the protrusion 172 may thus have a top or outermost surface, which may be defined by an exposed surface of the one or more magnets. In other examples, the magnet(s) may be embedded and the top or outermost surface of the protrusion may be defined by the surface of an enclosure around the embedded magnet(s). In this illustrated example, the protrusion 172 is configured such that the top surface does not contact the base 131 when the camera 11' is attached to the temple 210. The height of the protrusion 172 may be slightly less than a depth of the track thereby defining a gap G between the protrusion and base of the track when the electronic wearable device (e.g., camera 11') is attached thereto. The gap G defined between the opposing top surface of protrusion 172 and base 131 when the camera 11' is attached to the temple 210 may enable the camera 11' to more easily slide along the temple guide 118 (e.g., float over the base 131 of the track 230). In some examples, the gap G may be less than 0.1 mm. In some examples the gap G may be less than 0.05 mm, such as 0.04 mm, 0.03 mm or 0.01 mm. In some examples, a gap G may be defined between the base of the track and the outermost surface of the magnet irrespective of whether a surface of the protrusion contacts the base of the track. In examples, the magnet and base 131 may be spaced apart or distance-separated even though a surface of the protrusion or other enclosure around the magnet contacts the base of the track.

It will be understood that any of the embodiments of eyewear systems may be configured to include a gap G between the opposing and magnetically attracting faces of the device guide and temple guide. In other words, the camera 11' and temple guide 118, for example, may be configured such that the bottom surface of the camera guide 19 and the base 131 of the track 130 do not contact during normal use. In some examples, the magnets specifically may be spaced apart from the temple surfaces such as to avoid rubbing of the magnets against any of the aesthetic surfaces of the temple. This spacing may be achieved by recessing the magnet below the bottom surface of the device guide such that the bottom surface of the device guide may contact the base of the track while the magnet itself does not. The bottom surface of the device guide may be part of the housing or attached thereto and may be formed of a plastic material thus reducing the risk of damage to the temples. As will be appreciated, all exposed surfaces of the temple, such as on the outside side of the temple, including the walls and base of the track, may be considered to be finished surfaces (e.g., surfaces that function as part of the finished aesthetic look of the eyewear). In other words, the eyewear may be worn with or without an electronic wearable device attached thereto without diminishing the aesthetic look of the eyewear, and in some examples the aesthetic look of the eyewear may be enhanced by the presence of the track. As such, the attachment of an electronic wearable device to the temple is not a necessary condition for a wearer to enjoy the use of the eyewear, e.g., attaching an electronic wearable device or any other type of feature is not essential to provide a finished aesthetic look for the eyewear.

Figure 5A:
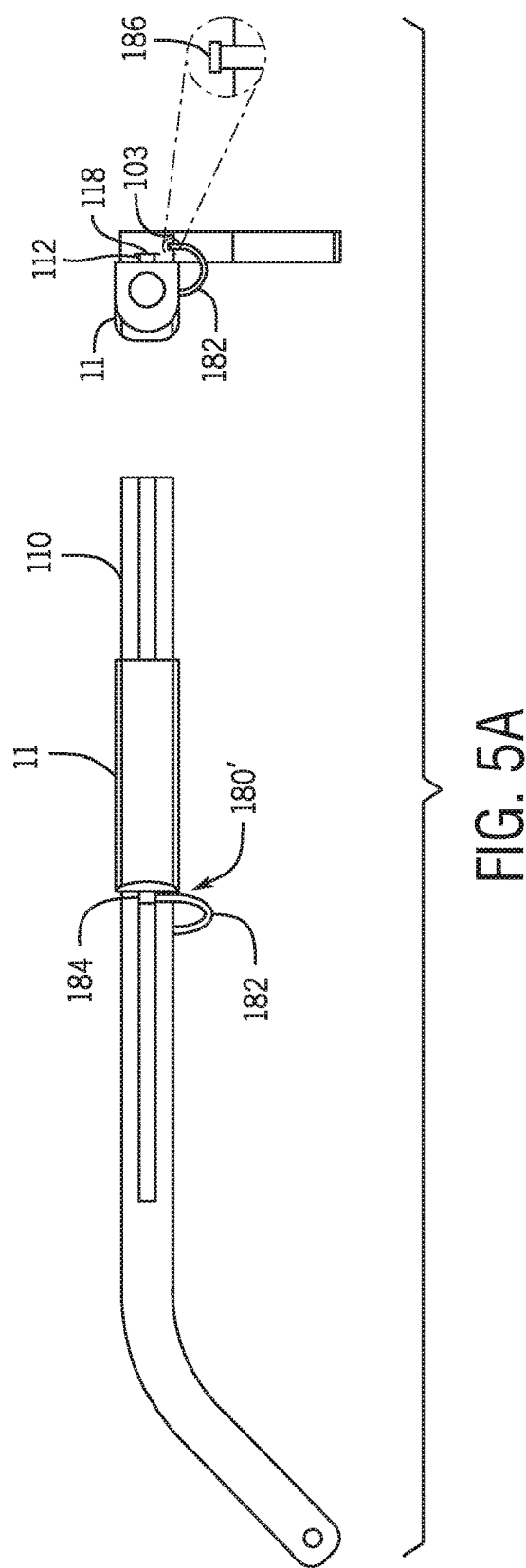

Further examples of safety catches of eyewear systems are described with reference to FIGS. 5A-5C. The safety catch 180' in FIG. 5A includes a lanyard 182 which is attached to the temple 110 and a securing feature 184 attached to the camera 11. Instead of being looped around the temple as described with reference to FIG. 2B, the lanyard is attached to an underside 103 of the temple 110. The lanyard includes a T-shaped fitting 186, which is received in a T-shaped slot on the underside 103 of the temple. The T-shaped slot may span the same or substantially the same distance as the length of the guide 118 such that the lanyard may slide along with the camera while remaining attached to the T-shaped slot via the fitting 186. The T-shaped slot may have an open end, e.g., at the forward end 115 or the distal end 116 of the temple, to enable removal of the camera 11 from the eyewear frame when desired.

The safety catch 180" in FIG. 5B includes a lanyard 182 which is attached to the temple 110 and a securing feature 184 attached to the camera 11. Instead of being looped around the temple as described with reference to FIG. 2B, the lanyard is attached to a trolley 188 which is also configured to slide along the guide 118. The trolley may be magnetically attached to the guide 118 in a manner similar to the device guide. In some examples, the trolley is configured to exhibit a stronger magnetic attraction with the temple guide as compared to the magnetic force between the device guide and the temple guide. In some examples, the temple guide may shaped to mechanically retain the trolley therewithin.

Figure 5C:
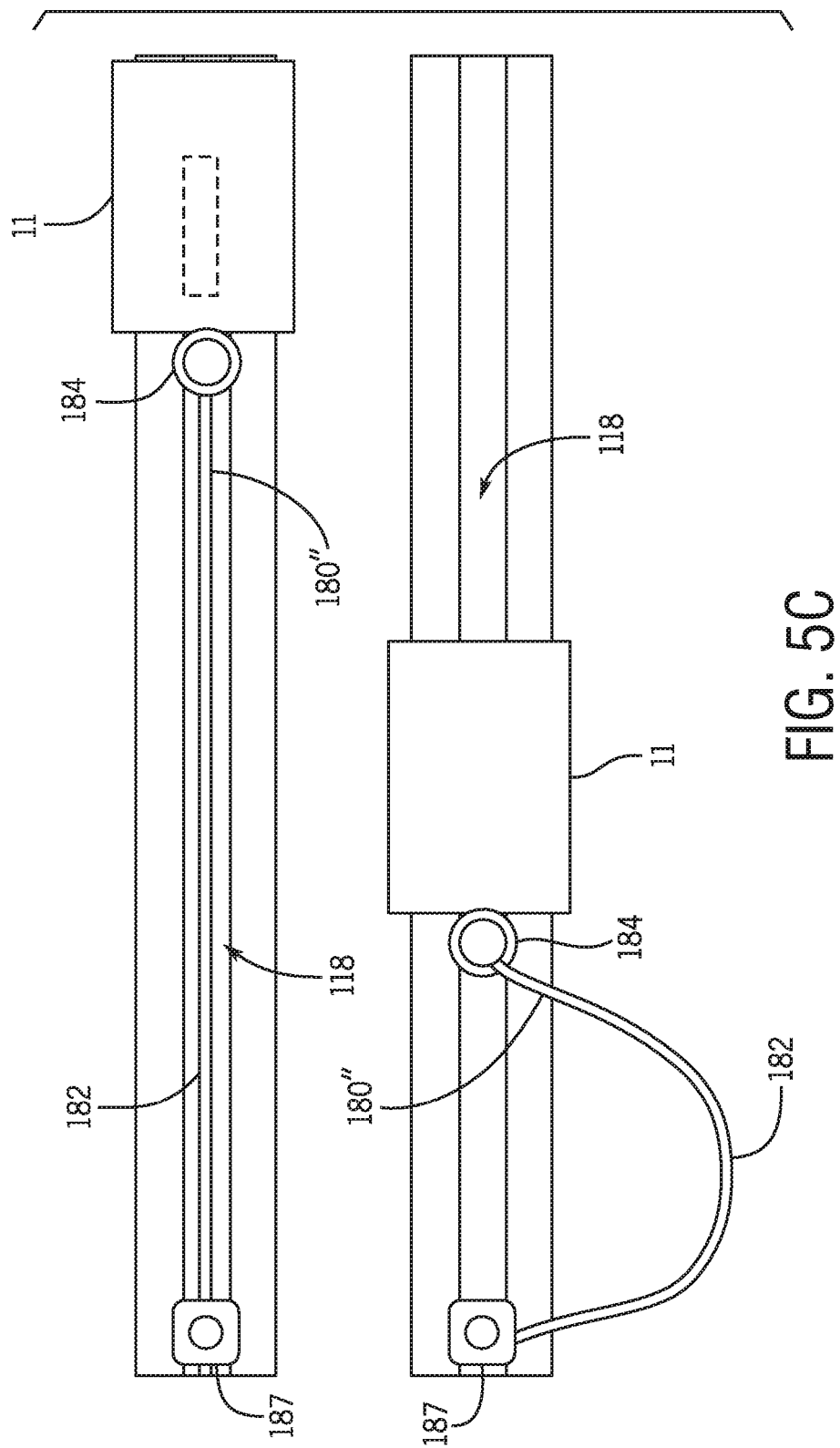

In the example in FIG. 5C, the safety catch 180''' includes a lanyard 182 which is irremovably attached at one end to a fixture 187 disposed at the aft end of the guide 118 and at the opposite end to the securing feature 184. The length of the lanyard 182 is sufficient to allow the camera to move from the aft end all the way to the forward end of the guide. In this manner, the safety catch 180''' maintains the camera 11 tethered to the temple while allowing movement of the camera along the guide.

Figure 6:
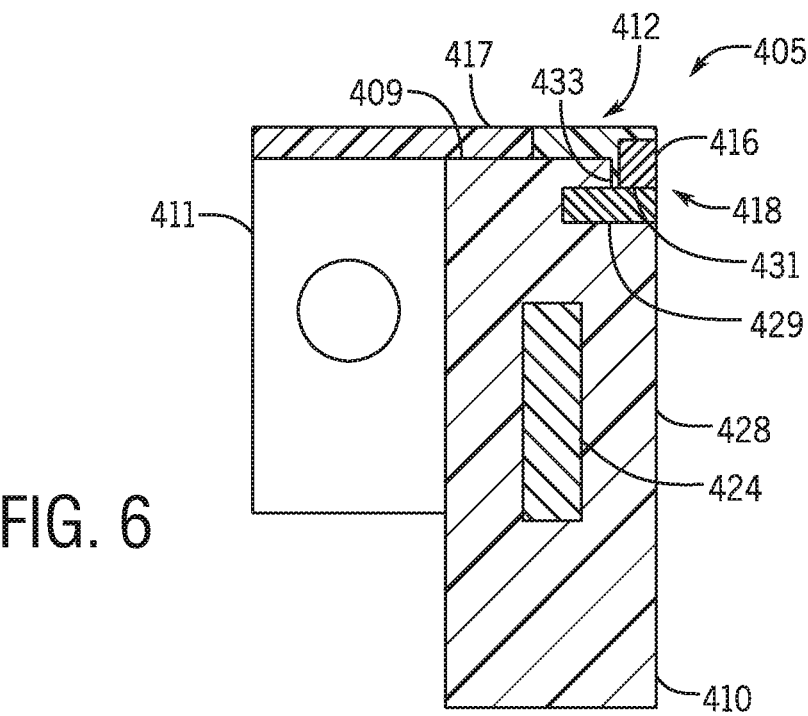
FIG. 6 shows a simplified cross-sectional view of a temple and electronic wearable device attached to the temple according to another embodiment.

FIG. 6 illustrates a simplified cross-sectional view of another embodiment of an eyewear system 405. The eyewear system include a temple 410 of an eyewear frame and electronic wearable device 411 (e.g., camera) attached to the temple 410. The electronic wearable device 411 includes a device guide 412. The device guide 412 may be provided on an arm 417. The arm 417 is configured to be positioned over a top side 409 of the temple 410. The arm 417 may be extendible (e.g., a telescoping arm) such that the electronic wearable device 411 may be attachable to temples of different thicknesses. The device guide 412 includes a magnet 416, attached to the arm. In some examples, a surface of the magnet may be exposed such that it contacts the temple when the electronic wearable device 411 is attached thereto. In other examples, an interface layer may be provided between the magnet and temple surface to reduce damage to the aesthetic surface of the eyewear (e.g., scratches), which may be otherwise caused by a magnet sliding in contact with the eyewear. The interface layer may be provided for example by embedding the magnet slightly below the contact surface of the arm or by a coating provided on the exposed surface of the magnet. The coating may be friction reducing coating.

The temple 410 may include a temple guide 418. The temple guide in this example is located on the top side of the temple 410. The temple guide is in the form of a female guide (e.g., track) which includes a ferromagnetic strip 429 provided at the base of the guide. The temple 410 may optionally include an insert 424, which may or may not be ferromagnetic, and an outer material 428, which encloses the insert. In accordance with the examples herein, the temple guide 418 includes guide surfaces (e.g., base 431 and sidewall 433), which constrain movement of the electronic wearable device 411 in one or more directions relative to the temple. At least one of the guide surfaces, in this example base 431, is defined by the ferromagnetic material of the strip 429. In other examples, the strip 429 may be arranged such that it defines the sidewall 433 instead of the base 431, such as by positioning the strip closer to the top side 409. In other examples, the strip 429 may be arranged such that it defines both the sidewall 433 and the base 431, such as by using an L-shaped ferromagnetic member to define the shape of the track.

Figure 7:
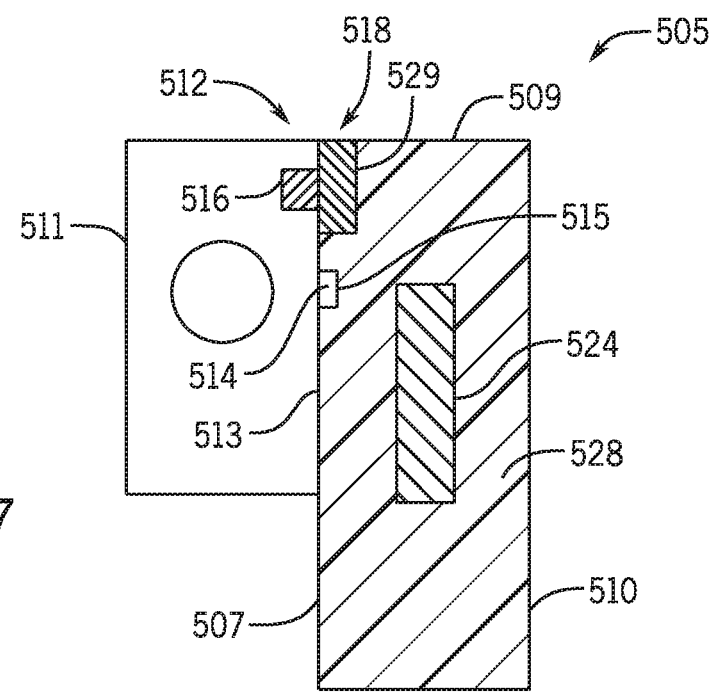
FIG. 7 shows a simplified cross-sectional view of a temple and electronic wearable device attached to the temple according to yet another embodiment.

FIG. 7A illustrates a simplified cross-sectional view of another embodiment of an eyewear system 505. The eyewear system includes a temple 510 and electronic wearable device 511 attached to the temple 510. The electronic wearable device 511 includes a device guide 512, which may be provided along a side 513 of the electronic wearable device 511. The device guide 512 may include a magnet 516 and optionally a guide protrusion 514 spaced from the magnet. The temple may be formed of a material 528 and may optionally include a core wire 524 embedded in the material 528. The temple 510 may include a temple guide 518. The temple guide 518 may include a ferromagnetic strip 529, which may be flush with the outer surface of the material 528. The temple guide 518 may optionally include a groove 515 spaced from the strip 529 and shaped to receive the protrusion 514. The magnet 516 may be arranged to engage the strip 529 when the side 513 of the electronic wearable device 511 is positioned against the outside side 507 of the temple 510. The protrusion 514 and groove 515 may serve as locating and interlocking features, e.g., to position the electronic wearable device 511 for engagement with the temple guide 518 and to restrict movement of the electronic wearable device 511 in one or more directions relative to the temple 510 while the electronic wearable device 511 remains attached thereto. In the illustrated example, the strip 529 is positioned near a top side 509 of the temple 510 and a single groove 515 is provided spaced downward from the strip 529. In other examples, the strip may be different positioned and a different arrangement and number of grooves may be used.

Figure 8A:
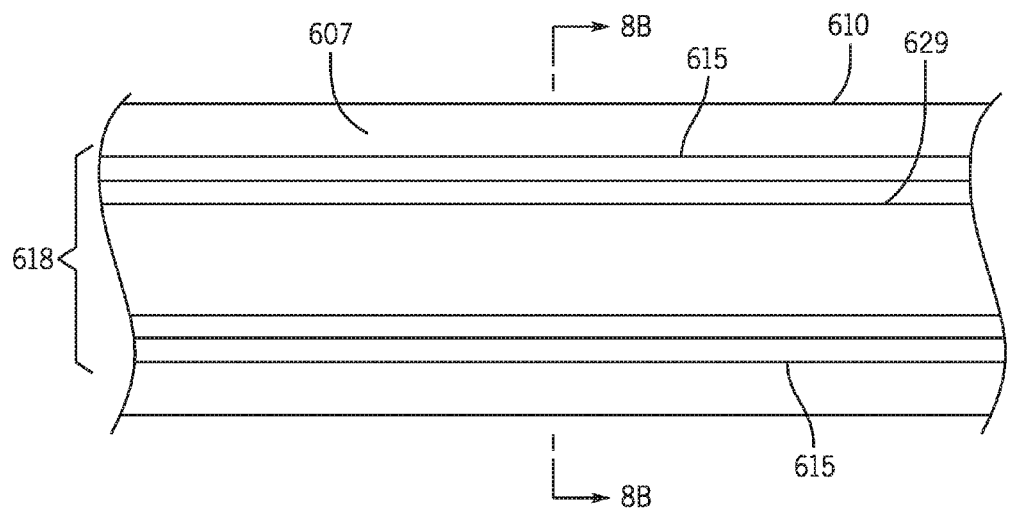
FIGS. 8A and 8B show partial side and cross-sectional views of a temple according to another embodiment.
Figure 8B:
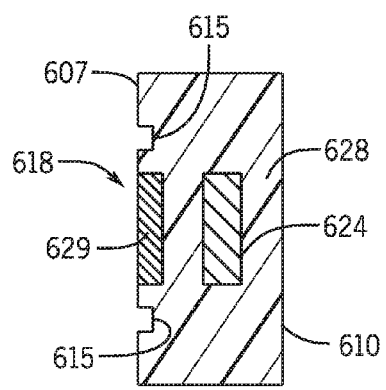
Figure 14B:
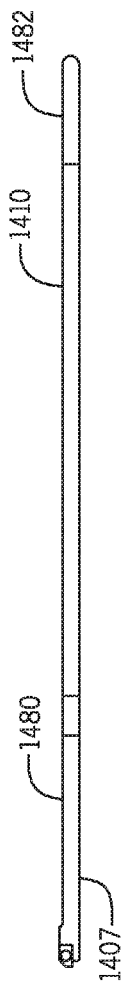
FIGS. 14A-14D show views of a thin eyewear temple with a temple guide according to another embodiment.
Figure 14A:
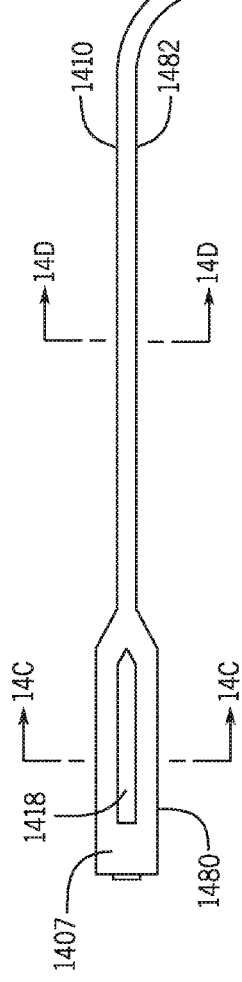
Figure 14D:
Figure 14C:
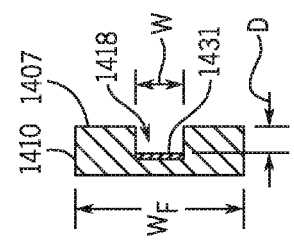
Figure 15A:
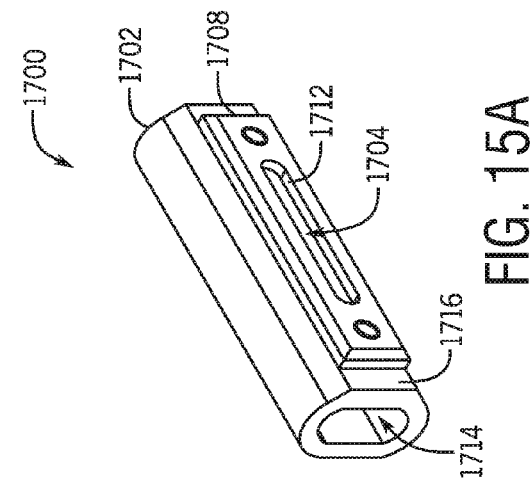
FIGS. 15A-15E show views of an adapter in accordance with an embodiment of the present disclosure.
Figure 15C:
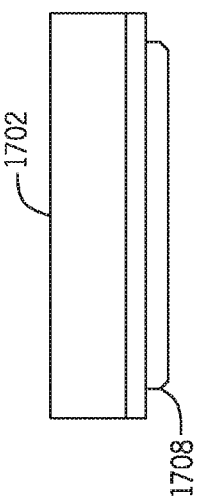
Figure 15B:
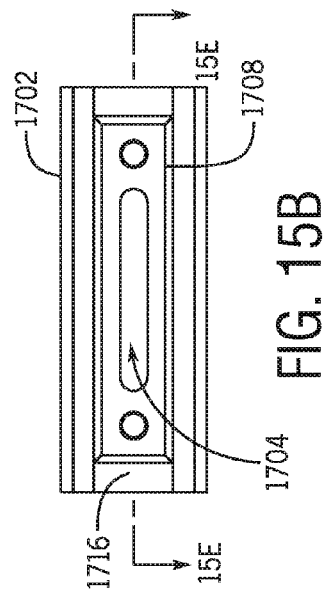
Figure 15E:
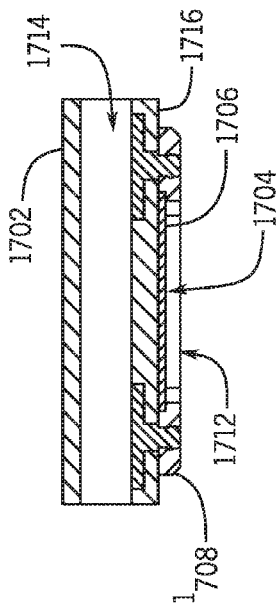
Figure 15D:
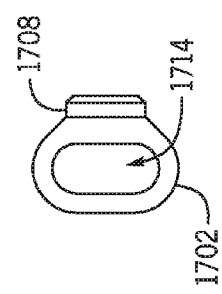

For example, FIGS. 8A and 8B illustrate partial side and cross-sectional views of a temple 610 in accordance with another embodiment. The temple 610 may be formed of a material 628, such as plastic, and may optionally include a core wire 624 embedded in the material 628. The temple 610 includes a guide 618 that includes a ferromagnetic strip 629 positioned substantially flush with the outside side 607 of temple 610. One or more grooves 615 may be provided spaced apart from and extending along the length of the strip 629. Each of the grooves may be configured to engage a corresponding protrusion on an electronic wearable device (not shown in this view). In this manner, the guide 618 may be configured to magnetically retain the electronic wearable device in attachment (e.g., by magnetic attraction) to the temple and may further function to restrain movement of the electronic wearable device in one or more directions (e.g., up and down, in-plane rotation, etc.) relative to the temple.

In another example, as shown in FIGS. 9A and 9B, the temple 710 may similarly be formed of a material 728, such as plastic, and may optionally include a core wire 724 embedded in the material 728. The temple 610 may similarly include a guide 718 that includes a ferromagnetic strip 729 positioned substantially flush with the outside side 707 of temple 710. However, in this example, one or more grooves 715 may be provided in the strip 729. The groove 715 may be a generally rectangular channel open to the exposed surface of the strip 729 and extending along the length of the strip 729. The groove 715 may be configured to engage a corresponding protrusion on an electronic wearable device (not shown in this view). In this manner, the guide 718 may be configured to magnetically retain the electronic wearable device in attachment (e.g., by magnetic attraction) to the temple and may further function to restrain movement of the electronic wearable device in one or more directions (e.g., up and down, in-plane rotation, etc.) relative to the temple.

FIG. 10 illustrates a simplified cross-sectional view of yet another embodiment of an eyewear system 805. The eyewear system include a temple 810 of an eyewear frame and electronic wearable device 811 (e.g., camera) in engagement with the temple 810. The temple 810 is formed of a material 828, such as plastic, and includes an insert 820 made from a ferromagnetic material, e.g., stainless steel. The electronic wearable device 811 is slidably attached to the temple 810 via with a temple guide 818. The electronic wearable device 811 includes a device guide 812, which is provided on an arm 817. The arm 817 is configured to be positioned over a top side 809 of the temple 810. The arm 817 may be extendible such as to be positionable over temples of different thicknesses. The device guide is implemented as a male guide (e.g., a protrusion 870) and includes a magnet 816 attached to the arm.

The temple 810 may include a temple guide 818. The temple guide 818 in this example is located on the top side 809 of the temple 810 and is implemented in the form of a female guide (e.g., a track 830). The track is defined by a longitudinal slot formed in the temple (e.g., on the top side 809) and extending to a depth sufficient to expose the insert 820. The guide 818 includes one or more guide surfaces (e.g., base 831 and sidewalls 833 of track 830) which are operable to constrain movement of the electronic wearable device 811 in one or more directions relative to the temple 810. At least one of the guide surfaces, in this case the base 831, is defined by a ferromagnetic material of the temple (e.g., the insert). In some examples, the magnet 816 may be exposed or embedded within the material forming the arm (e.g., a rigid plastic material), which may be the same material as used for the housing of the electronic wearable device 811. In other examples, a coating (e.g., friction-reducing coating) may be provided over an exposed surface of the magnet 816 to reduce the frictional between the magnet 816 and temple 810. In yet further examples, the magnet 816 and/or the bottom surface of the protrusion 870 may be spaced from the base 831 of the track 830 such that the protrusion 870 floats over the base 831 of track 830 with a small gap remaining between the facing surfaces of the protrusion 870 and track 830 when the electronic wearable device 811 is attached to the temple 810.

As will be appreciated, the guides 812 and 818 are configured such as to enable attachment and detachment of the electronic wearable device 811 by insertion of a portion of the electronic wearable device 811 (e.g., the protrusion 870) into the track 830 along a direction perpendicular to the base of the track. In this manner, attachment and detachment of the electronic wearable device 811 may be simplified. Attachment may be achieved by simply placing the electronic wearable device 811 over the temple and allowing the magnetic attraction force to move the electronic wearable device 811 perpendicularly to the track to snap the electronic wearable device 811 into engagement with the temple. As such, attachment and detachment may not require manipulation of any miniaturized or intricate connection components in order to secure the electronic wearable device 811, which may improve the user experience. This functionality may of course apply to other embodiments described herein, such as any of the embodiments describes in FIGS. 1-9 or any of the embodiments described further below.

It will be generally understood that aspects of any of the examples herein may be used in combination with any other examples of the present disclosure. For example, any of the temples described herein (e.g., temple 410, 510, 610, 710, 810, etc.) may be used to implement the temple 24 of FIG. 1 and any of the device guides (e.g., guide 412, 512, 812, etc.) may be used to implement the device guide 12 of FIG. 1. Also, one or more of the aspects of the eyewear systems described with reference to FIGS. 1-5 and also described further below with reference to FIGS. 11-15 may be applied to the examples in FIGS. 6-10.

FIGS. 11-13 show components of an eyewear system according to another embodiment. The eyewear system includes a temple 1110 for eyewear and an electronic wearable device (e.g., camera 1111). A temple guide 1118 is provided on the temple for attaching the electronic wearable device (e.g., camera 1111) to the temple 1110. The temple guide 1118 is implemented as a male guide (e.g., a rail 1170). The rail 1170 protrudes from the outside side 1107 of the temple 1110. The temple 1110 includes an insert 1120 which may be embedded within an outer material 1128 (e.g., plastic) and may function to reinforce the temple 1110.

In some examples, the temple guide 1118 includes a ferromagnetic material (e.g., stainless steel). The ferromagnetic material may be provided as a coating on one or more surfaces of the rail (e.g., on the top surface 1172 and/or sidewalls 1171). In some examples, the rail may be made from the ferromagnetic material. In some examples, the insert may be made from a ferromagnetic material. In some examples, the insert 1120 and temple guide 1118 may be made from the same material and formed integrally with one another. As shown in the illustrated example, the insert and temple guide form a T-shaped beam (see e.g., FIG. 11) along a portion of the length of the temple. In other examples, the insert and rail may be formed of different material and joined together to form the T-shaped beam. Different arrangements, for example an insert and rail combination having a different cross-sectional geometry (e.g., an L-shaped beam, I-shaped beam, U-shaped beam, etc.) may be used. In the illustrated example, the rail is shorter than the length of the insert; however the length of the rail may be increased to provide a longer path for the camera. Of course, a shorter rail may also be used. In some specific non-limiting embodiments, the rail may be about 65 mm to about 100 mm long, in some examples from about 75 mm to about 85 mm, in some examples 80 mm.

The forward end 1135 of the rail 1170, the aft end 1137 of the rail 1170, or both, may be beveled. In some examples, forward end 1135, the aft end 1137, or both may include a hard stop, which prevent the camera from sliding off the rail along the rail direction. In the illustrated embodiment, the rails has a generally rectangular cross section and the camera 1111 may thereby be attached and removed from the rail in a direction perpendicular to the rail (e.g., to top surface 1172). Other cross-sections for the rail may also be used. The rail 1170 may be aligned with a predetermined direction (e.g., a centerline of the temple 1110) and may thus function to align the orientation of the camera 1111 (e.g., a line of sight of the camera 1111) with a predetermined direction (e.g., the centerline of the temple 1110).

The camera 1111 includes a device guide 1112, which is configured to engage the temple guide 1118. The temple and device guides 1118, 1112 respectively may be configured for slidably engagement with one another. In other words, the electronic wearable device (e.g., camera 1111) is slidable along the temple guide 1118 when the electronic wearable device is attached to the temple. For example, the device guide 1112 may define a guide channel 1174 for receiving the rail 1170. In the specific illustrated embodiment, the device guide 1112 includes first and second guide members 1176, which define the channel 1174 therebetween. The guide members 1176 may be configured to each be provided on opposite side of the rail 1170 (e.g., adjacent the sidewalls 1171) to restrict movement of the camera 1111 along the direction defined by the rail 1170. The guide members 1176 may be attached to or integrally formed with the housing of the camera. In the illustrated example, the device guide 1112 is configured to magnetically attach to the temple via the temple guide 1118. To that end, the device guide includes a magnet 1178. The magnet 1178 is disposed in the channel 1174 between the guide members 1176. In some examples, the temple and device guide members 1118, 1112, respectively are configured such that the magnet does not contact the top surface of the rail 1170 when the camera 1111 is attached to the temple. For example, the height of the rail 1170 and the depth of the channel 1174 may be selected such that a gap is maintained between the base of the channel and the top surface 1172 of the rail 1170 while magnetic attraction between the magnet 1178 and ferromagnetic material of rail 1170 maintains the camera 1111 attached to the temple.

FIGS. 14A-D shows an eyewear temple 1410 with a short temple guide in accordance with another embodiment. As illustrated in FIGS. 14A-D, a temple guide 1418 in accordance with the present disclosure may be provided even on very thin temples, such as on thin metal temple also referred to as a wire temple. The temple guide 1418 may extend along only a small portion of the temple, e.g., less than about 50% of the length of the temple, and in some examples less than about 30% of the length of the temple. In some examples, the guide 1418 extends about ⅓ of the length of the substantially straight arm portion of the temple, although in other embodiments, the length of the guide may be different. To that end, the temple 1410 may include a relatively wider landing or forward portion 1480 attached or integrally formed with a relatively thinner aft portion 1482 that curves to form the earpiece portion of the temple. In some examples, the width $W_F$ of the temple at the forward portion may be at least three times greater than the width $W_A$ at the aft portion. Although FIGS. 14A-14D illustrated an embodiment of a temple with rectangular cross-sections, the cross-section of the forward and/or aft portions may be different (e.g., the aft portion may be circular in cross-section). The landing portion 1480 may taper towards the thinner aft portion 1482 at the interface between the two portions.

The guide 1418 may include one or more of the features of guides described herein. For example, the guide 1418 may be in the form of a female guide (e.g., a track) formed in the landing portion 1480 of the temple. The track may include a base 1431 comprising a ferromagnetic material. In some examples, the temple 1410 itself may be made from the ferromagnetic material and the guide may be implemented by a groove cut into the outside side 1407 of the temple, with the material of the temple providing the guide surface. In other examples, the temple 1410 may include a layer or strip 1470 of ferromagnetic material provided at the base of a female guide 1418. In yet further examples, the guide 1418 may be a male guide, which is implemented in the form of a protrusion similar to the example in FIG. 11.

In accordance with some examples of the present disclosure, an adapter for attaching a wearable electronic device to an eyewear temple is described. The adapter may be configured to align the electronic wearable device in a predetermined orientation relative to the eyewear temple when the electronic wearable device is attached to the eyewear using the wearable device adapter. The adapter may be configured to position the electronic wearable device to an outside side of the temple when the electronic wearable device is attached to the eyewear using the wearable device adapter.

The adapter may include a body and a metallic feature. The body may be configured to removably attach the adapter to an eyewear temple of a plurality of differently shaped eyewear frames. In some examples, the body may be configured to be provided at least partially around an eyewear temple. For example, the body may define a passage through which the temple may be inserted to secure the adapter to the temple. In some examples, the body may be configured to be adjustable (e.g., stretchable or otherwise adjustable) to accommodate temples of different sizes. That is, the passage may be adjustable from a nominal shape or size to another shape or size. For example, the body may be formed of a stretchable material such as a stretchable plastic material. In some examples, the body may be formed of urethane or rubber (e.g., neoprene rubber). The body may be formed of a material including polyvinyl chloride, acrylic terminated urethane polymer, polyurethane, epoxyacrylate, epoxyurethane, polyethylene, polypropylene, polyethers, polyvinyl acetat, polysiloxane, siloxyacrylate, or combinations thereof. Other materials may be used. In some examples, the body may be formed of a fabric comprising natural or synthetic fibers. The metallic feature of the adapter is attached to the body and configured for magnetically retaining an electronic wearable device in attachment with the adapter.

FIG. 15 illustrates an embodiment of an adapter 1700 for attaching a wearable device (e.g., a camera) to eyewear. The adapter 1700 includes a body 1702 and a magnetic feature 1704. The body 1702 may be configured to removably attach the adapter 1700 to a variety of differently sized eyewear temples. The body 1702 may be in the form a tubular member (e.g., a sleeve) made from a stretchable material (e.g., urethane, rubber, stretchable cloth, or others). The body 1702 may be positionable around an eyewear temple, e.g., by insertion of the eyewear temple through the passage 1714 defined by the stretchable material of the body 1702. The passage 1714 may be circular, ovular, or differently shaped.

The magnetic feature 1704 may include a magnet or be attractable to a magnet. For example, the magnetic feature 1704 may be a strip 1706 of magnetic material (e.g., ferromagnetic material). In yet further examples, the magnetic feature 1704 may include a strip 1706 of non-ferromagnetic material provided with a layer of magnetic material on an exposed side of the strip 1706. The strip 1706 may be provided between the body 1702 and an adapter plate 1708, which defines a groove 1712. In some examples, the strip 1706 may be attached (e.g., bonded, fastened) to the body 1702. In some examples, the adapter plate 1708 may be attached to the body 1702 (e.g., bonded or fastened) with the strip 1706 sandwiched between the adapter plate 1708 and the body 1702, the adapter plate 1708 thereby attaching the strip 1706 to the body 1702. In some examples, the strip 1706 may be secured (e.g., bonded) to the adapter plate 1708 but not to the body 1702. The adapter plate 1708 and strip 1706 may be removable from the body 1702 such that another adapter plate with a differently sized or shaped groove may be attached to the body 1702 to permit attachment with a different wearable device. In some examples, the device guides on a variety of wearable devices may be standardized such that one universal adapter may enable attached of any such wearable device with virtually any eyewear.

The magnetic feature 1704 may be attached to an exterior side of the body, e.g., centered along the wall 1716. In this manner, when the electronic wearable device is attached to the eyewear temple via the adapter 1700, the electronic wearable device may be substantially aligned with the centerline of the temple. The body 1702 may be rotatable around the longitudinal axis of the temple to enable adjustment of the orientation of the electronic wearable device with respect to the centerline of the temple.

In some examples, the metallic feature may be part of a guide for an electronic wearable device, which may enable the removable attachment as well as slidable engagement between the electronic wearable device and the temple. In such examples, the adapter may fix the orientation of the electronic wearable device with respect to the temple but may not fix the position of the electronic wearable device on the temple. In other examples, the metallic features may be part of an attachment interface configured to substantially fix both the position and orientation of the electronic wearable device with respect to the adapter. In such examples, the attachment interface may have a size and shape substantially corresponding to the size and shape of a device guide. The attachment interface may be configured to receive the device guide and restrain movement of the electronic wearable device in both the longitudinal and lateral directions (plus or minus slight movement in either direction as may be due to manufacturing tolerances). When the attachment interface and device guide are engaged in a cooperating fit the electronic wearable device may be fixed (e.g., non-movable) with respect to the adapter.

Figure 16A:
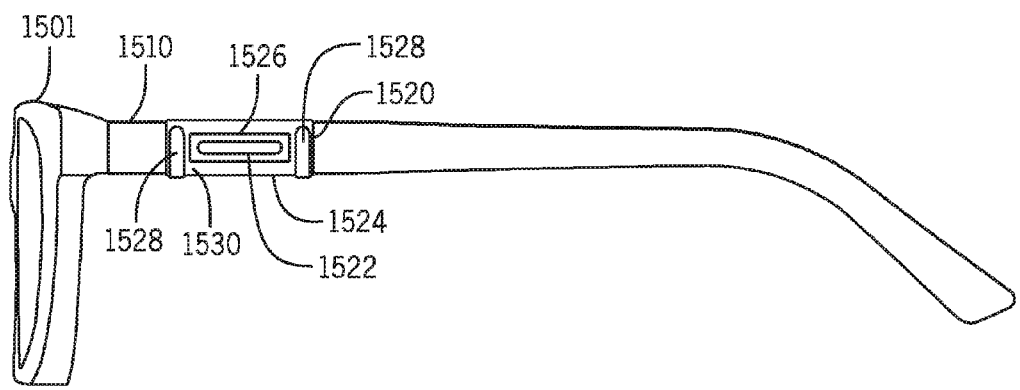
FIGS. 16A-16B show views of an adapter in accordance with another embodiment of the present disclosure.
Figure 16B:
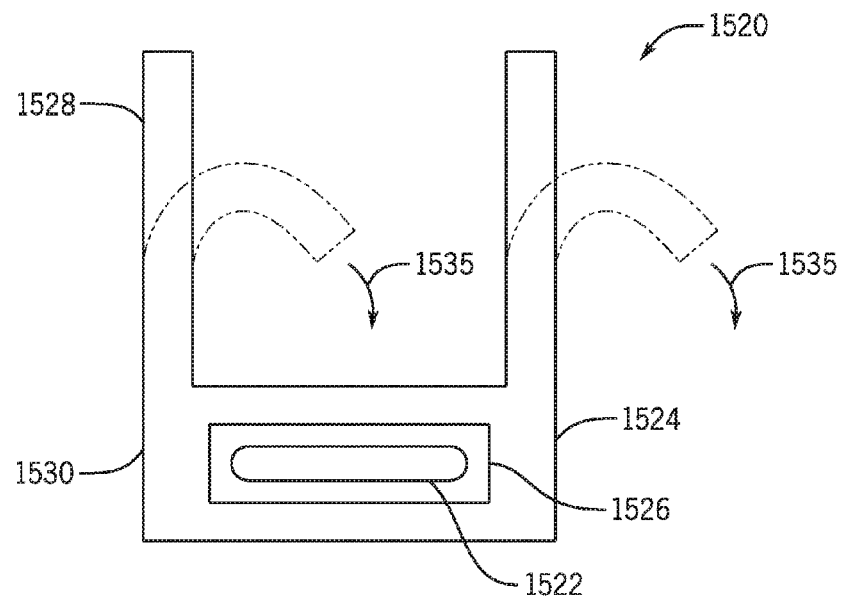

FIG. 16 illustrate another embodiment of an adapter 1520 for attaching a wearable device (e.g., a camera) to eyewear (e.g., eyewear 1501). The adapter 1520 includes a body 1524 and a magnetic feature 1522 attached to the body 1524. The body 1524 may be configured to removably attach the adapter 1520 to a variety of differently sized eyewear temples. One or more flexible attachment portions 1528 extend from an interface portion 1530 of the body 1524. The flexible attachment portions 1528, the interface portion 1530, or both may be made from a stretchable material (e.g., a stretchable fabric). During use, the flexible attachment portions 1528 may be folded over (e.g., as shown by arrows 1535) to be wrapped around the temple and ends of the flexible attachment portions 1528 may be secured to the interface portion, for example using an adhesive or a fastener, such that the body 1524 encircles the temple 1510 (e.g., the body 1524 surrounds a cross-section of the temple 1510). In some examples, the flexible attachment portions 1528 and interface portion 1530 may be integrally formed, for example from a sheet of stretchable fabric, which is able to adhere to itself without a tacky adhesive. For example, the flexible attachment portions 1528 and interface portion 1530 may be formed of self-adherent tape similar to that used in medical applications for bandages or wraps. The use of self-adherent material that does not include tacky adhesives may prevent damage to the temples (e.g., marring aesthetic surfaces of the temple with tacky residue from an adhesive). In other examples, only the end portions of the interface portion 1530, which underlie the flexible attachment portions 1528 when secured thereto, may be formed from self-adherent material. In other examples, other combinations of materials and securing means may be used to enable the adapter 1520 to be removably attached to any of a variety of dimple shapes. When attached to the temple, the adapter 1520 or at least a portion thereof may encircle the temple defining a passage similarly to adapter 1700. The adapter 1520 when attached to the temple may be rotatable and/or movable along the temple to adjust a position, alignment or orientation of the wearable electronic device.

The magnetic feature 1522 may be attached to the interface portion 1530 of the body 1524 for example using conventional techniques (e.g., adhesive, fasteners or via intermediate mechanical components, such as a clip or brackets). In some examples, the magnetic feature may be attached using an adapter plate 1526, which may be similar to the adapter plate 1708 of the previous example. The adapter plate 1526 may include a groove configured for cooperating fit with a device guide of an electronic wearable device. In some examples, the adapter and corresponding the groove may be sized to fix the position of the electronic wearable device with respect to the adapter. In other words, the groove may be of a corresponding shape or size to that of the protrusion of a device guide, such that when the protrusion is inserted in the groove the electronic wearable device is substantially prevented from moving in the longitudinal and lateral directions relative to the adapter and is only free to move in a direction perpendicular to the magnetic feature 1522 (e.g., out of the plane of the illustration in FIG. 16A) to enable the attachment and removal of the electronic wearable device to the adapter. In other examples, the groove may be longer to permit sliding engagement similar to a temple guide as described herein.

Although the examples of guides and eyewear systems including such guides have been described herein with an exemplary electronic wearable device in the form of a camera, the electronic wearable device 10 may be virtually any miniaturized electronic device, for example and without limitation a camera, image capture device, IR camera, still camera, video camera, image display system, image sensor, repeater, resonator, sensor, sound amplifier, directional microphone, eyewear supporting an electronic component, spectrometer, microphone, camera system, infrared vision system, night vision aid, night light, illumination system, pedometer, wireless cell phone, mobile phone, wireless communication system, projector, laser, holographic device, holographic system, display, radio, GPS, data storage, memory storage, power source, speaker, fall detector, alertness monitor, geo-location, pulse detection, gaming, eye tracking, pupil monitoring, alarm, air quality sensor, CO sensor, CO detector, $CO_2$ sensor, $CO_2$ detector, air particulate sensor, air particulate meter, UV sensor, HEV sensor, UV meter, IR sensor IR meter, thermal sensor, thermal meter, poor air sensor, poor air monitor, bad breath sensor, bad breath monitor, alcohol sensor, alcohol monitor, motion sensor, motion monitor, thermometer, smoke sensor, smoke detector, pill reminder, audio playback device, audio recorder, acoustic amplification device, acoustic canceling device, hearing aid, assisted hearing assisted device, informational earbuds, smart earbuds, smart ear-wearables, video playback device, video recorder device, image sensor, alertness sensor, information alert monitor, health sensor, health monitor, fitness sensor, fitness monitor, physiology sensor, physiology monitor, mood sensor, mood monitor, stress monitor, motion detector, wireless communication device, gaming device, eyewear comprising an electronic component, augmented reality system, virtual reality system, eye tracking device, pupil sensor, pupil monitor, automated reminder, light, cell phone device, phone, mobile communication device, poor air quality alert device, sleep detector, doziness detector, alcohol detector, refractive error measurement device, wave front measurement device, aberrometer, GPS system, kinetic energy source, virtual keyboard, face recognition device, voice recognition device, sound recognition system, radioactive detector, radiation detector, radon detector, moisture detector, humidity detector, atmospheric pressure indicator, loudness indicator, noise indicator, acoustic sensor, range finder, laser system, topography sensor, motor, micro motor, nano motor, switch, battery, dynamo, thermal power source, fuel cell, solar cell, thermo electric power source, a blue tooth enabled communication device such as blue tooth headset, a hearing aid or an audio system. In some examples, the electronic device may be a smart device.

Figure 20A:
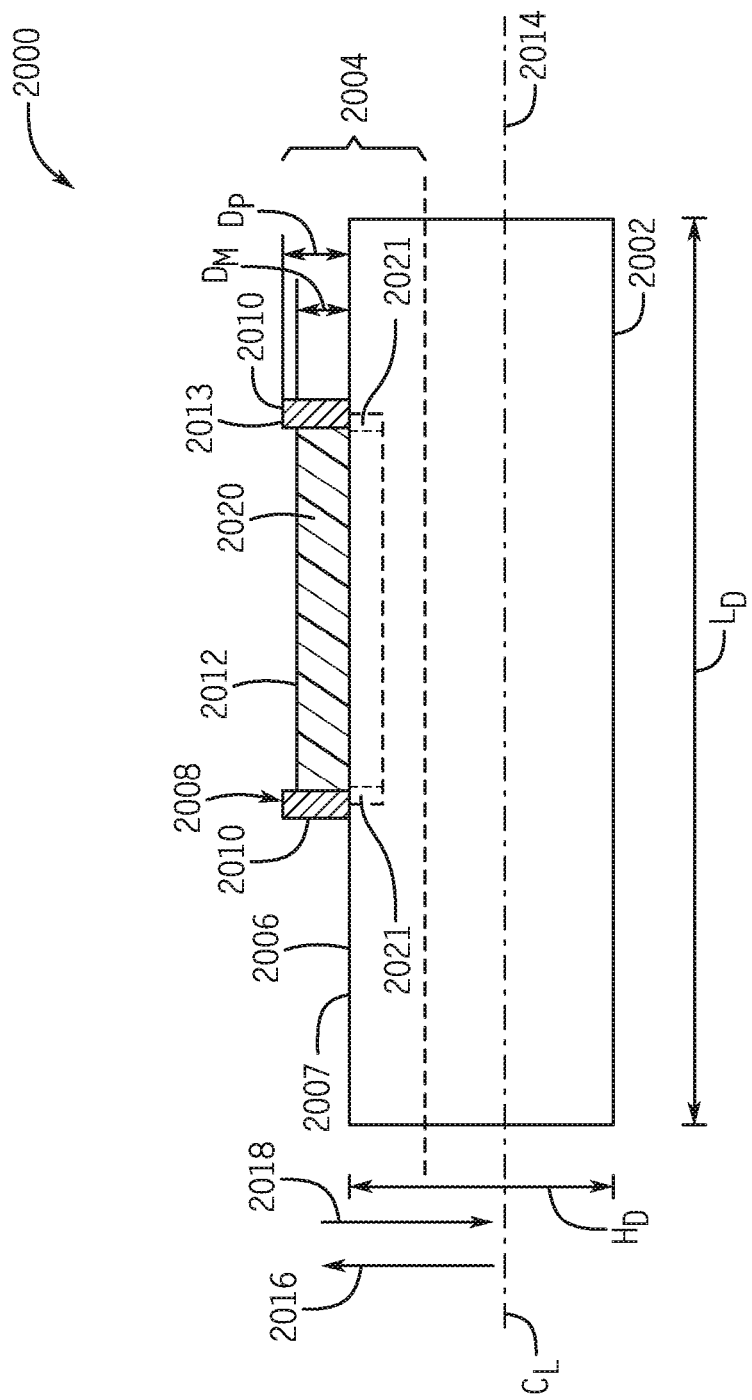
FIGS. 20A, 20B, and 20C show electronic wearable devices configured for magnetic attachment to wearable articles according to further examples of the present disclosure.
Figure 20B:
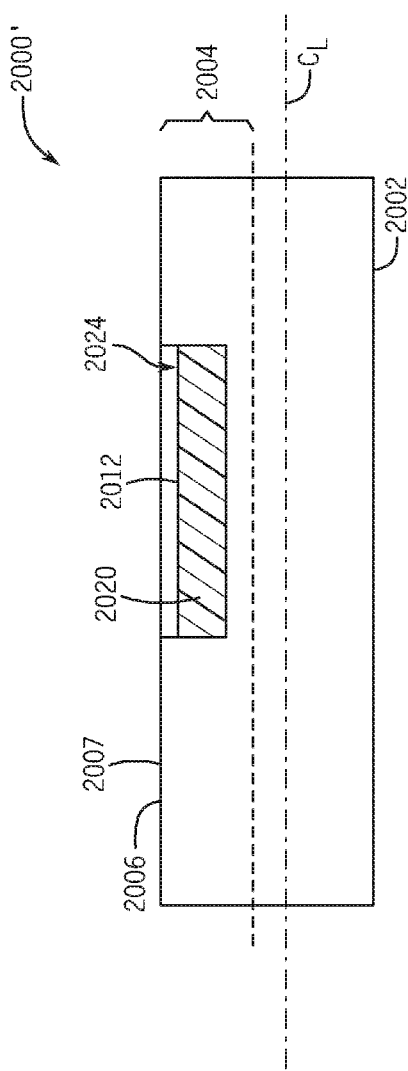
Figure 20C:
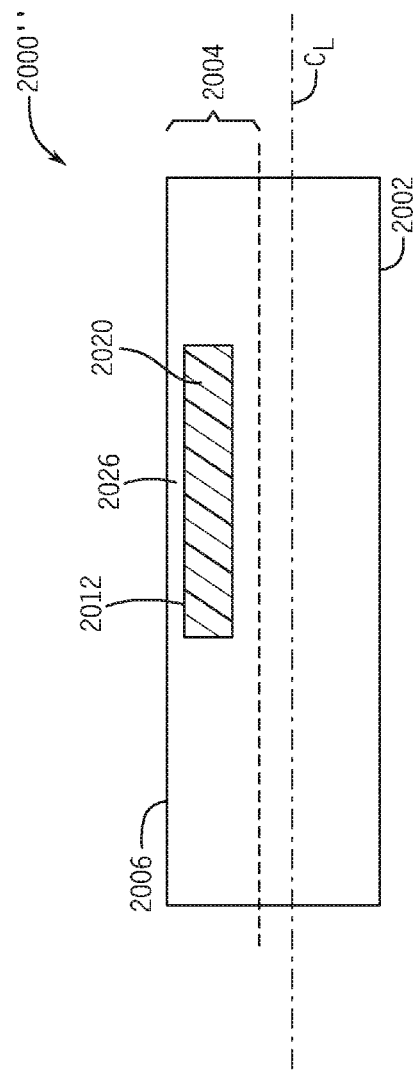
Figure 21:
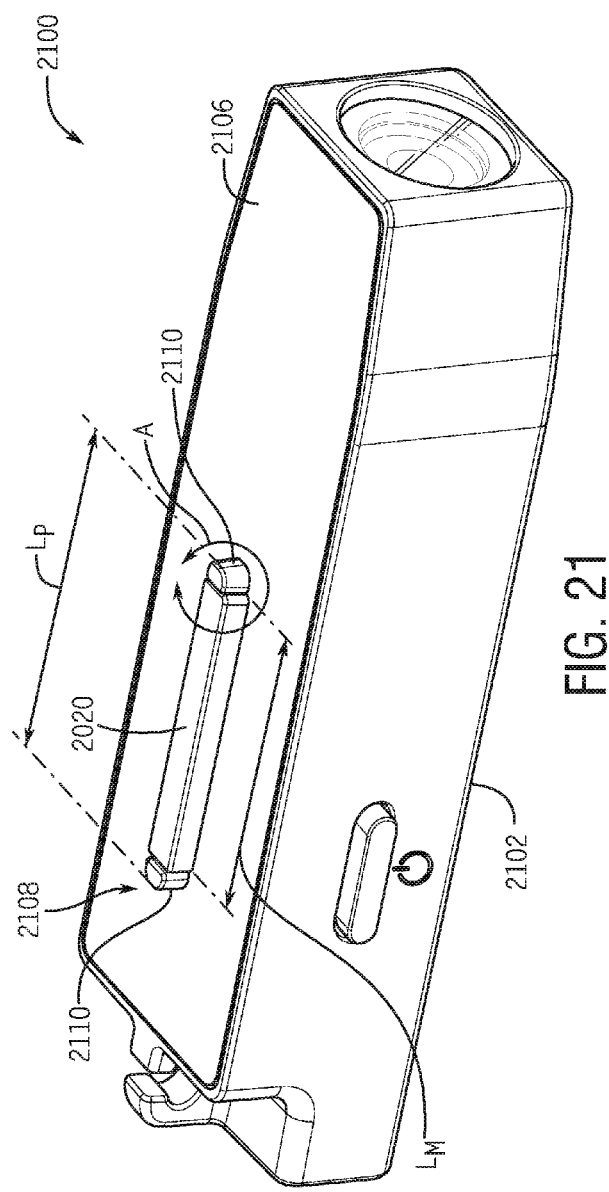
FIG. 21 shows a camera configured for magnetic attachment to wearable articles according to further examples of the present disclosure.

FIGS. 20-21 illustrate further examples in accordance with the present disclosure. As described herein, systems for magnetically attaching an electronic wearable device, for example a camera, may be provided by way of a track located on a side of an eyewear temple to which the camera is magnetically attracted to and thereby attachable to. The eyewear temple tracks may include a coated or uncoated ferromagnetic material. In some examples, the ferromagnetic material of the track may be provided by a ferromagnetic insert in the eyewear temple. The surface of the insert may be exposed and define the base of the track or the insert may be slightly below the base of the track or function to attract the camera even in the absence of a track. In some examples, the ferromagnetic material may be provided by a ferromagnetic coating on the base of the track, which may be defined by a non-metallic or non-ferromagnetic metallic material. In some examples, any of a variety of other coatings may, alternatively or additionally, be applied to the track, for example to the base of the track, (e.g., friction reducing, corrosion reducing, paint, lacquer or any other type of aesthetic coating).

The track and cooperating attachment means on the electronic wearable device (e.g., camera) may be configured such that the electronic wearable device (e.g., camera) may be slidable forward and backward along the track, which may enable the positioning of the camera at any number of a plurality of different positions along the length of an eyewear temple. For example, the camera may be thus positionable at a forward position, in which the camera may be aligned with or forward of the forward most portion of the eyewear (e.g., to provide a large unobstructed field of view of the camera), at a rear position, in which the camera is towards or substantially at the back end of the track (e.g., to conceal or reduce the visibility of the camera from bystanders), and at any number of other intermediate positions between the forward and rear position of the camera. The camera may be so positionable while remaining attached to the eyewear by way of the magnetic attraction between the camera and the track. As described herein, the track may also provide aesthetic benefit to the user (e.g., by enhancing the appealing look of the eyewear). In some instances, over time, the track and/or camera attachment means may exhibit wear such as may be due to the repeated movement (e.g., sliding or attachment/detachment) of the camera to the track. For example, repeated forward and backward sliding of the camera along the track and thus the repeated rubbing of the ferromagnetic materials on the camera and track (e.g., magnet on camera against ferromagnetic metal on the track, or vice versa) may cause scratching of the coating of a coated track. These scratches or other type of cosmetic blemishes due to use of the track may not acceptable to a wearer of the eyewear.

In accordance with some examples, herein, an eyewear system may include features to prevent or reduce the risk of damage (e.g., scratches or other cosmetic blemishes) to an eyewear equipped with the ability to attach a wearable device. In accordance with some of the examples herein, the system may be configured such as to enable a user to slide the electronic wearable device forward and backward along the track over 2,500 times without causing any perceivable (to a human eye) scratches of the eyewear temple track. As a general estimate, a user may slide a wearable device about 2,000 times during a typical 2-year use period and thus, the improvements herein may significantly reduce or eliminate any visible aesthetic damage to the eyewear track over a life of 2 years of use of the eyewear with the electronic wearable device. Eyewear is generally is replaced every 2-3 years in the US.

An electronic wearable device according to some examples herein may include a device body including at least one electronic component, the device body having an attachment side configured to movably attach the electronic wearable device directly to an eyewear temple by magnetic attraction between the electronic wearable device and the eyewear temple such that the device body is positionable at a first position along a length of the eyewear temple and in a second position along the length of the eyewear temple while remaining attached to the eyewear temple, and a magnet arranged proximate the attachment side such that the magnet does not contact a surface of the eyewear temple when attached thereto. In some examples, the device body includes a protrusion extending from the attachment side for movably coupling the device body to the eyewear temple, and wherein the magnet is arranged proximate the protrusion such that an outermost lateral surface of the magnet is medially positioned relative to an outermost surface of the protrusion.

Figure 21A:
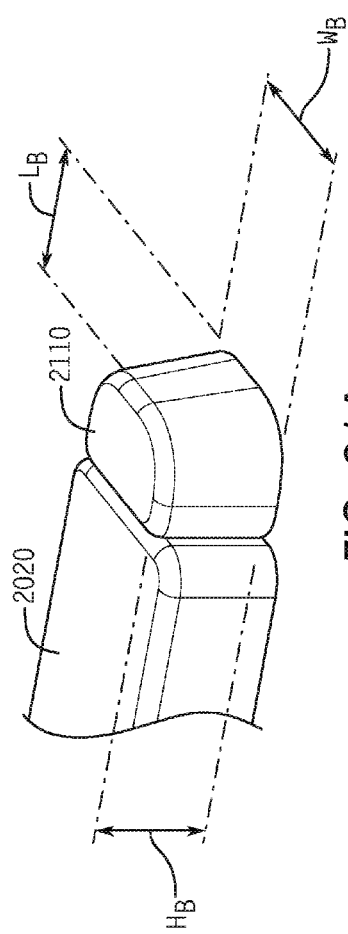
FIGS. 21A and 21B show enlarged views of portions of the camera in FIG. 21.

FIG. 21A shows an electronic wearable device 2000 in accordance with the some examples of the present disclosure. The electronic wearable device 2000 may be a camera, such as any of the cameras described herein or any wearable camera implemented in accordance with the examples in U.S. patent application Ser. No. 15/802,782, titled "Wearable Camera System," and U.S. patent application Ser. No. 15/802,782, titled "Architecture for Camera Devoid of Viewfinder," which applications are incorporated herein by reference in their entirety for any purpose. The electronic wearable device 2000 may have an elongate device body 2002 (e.g., a body that has a frontal dimension, for example a height ($H_D$) which is smaller than a length ($L_D$) of the device). The longitudinal or length-wise dimension or direction would be understood to be the dimension or direction generally aligned with the length $L_D$ of the device 2000. The lateral direction would be understood to refer to a direction generally perpendicular to the longitudinal direction. The terms "laterally" and "medially" would be understood to refer to relative positions along the lateral direction, which are away from (see arrow 2016) and towards (see arrow 2018) a longitudinal centerline 2014 of the device, respectively.

The electronic wearable device 2000 includes an attachment portion 2004, which includes at least one ferromagnetic member (e.g., magnet 2020). In this illustrated example, the magnet 2020 is arranged proximate the attachments side 2006 of the device 2000. In the illustrated example, the magnet 2020 extends or protrudes from the attachment side 2006 by a distance $D_M$. The device 2000 includes a protrusion 2008 extending from the attachment side 2006 by a distance $D_P$, which is greater than the distance $D_M$, such that an outermost lateral surface 2012 of the magnet 2020 is located medially relative to the outermost surface(s) 2013 of the protrusion 2008. The surface 2012 of the magnet may be exposed, coated, or enclosed below a surface of an enclosure defined by the protrusion. In some examples, a portion of the magnet may be below a surface 2007 of the attachment side 2006, which may facilitate a stronger attachment between the magnet 2020 and device body 2002; however, it will be understood that embodiments in which the bottom surface of the magnet is substantially flush with the surface 2007 or above the surface 2007 (e.g., fully within the protrusion) are also envisioned. In some examples, a portion of the magnet 2020 may be embedded below a portion of the protrusion 2008. For example, the magnet may include front and/or rear lip portions 2021, which may be positioned such that they are below the bumps 2010 defining the protrusion 2008. In this manner, a stronger mechanical connection between the magnet and device body may be achieved. In some examples, the magnet 2020 may be additionally or alternatively bonded to the device body 2002. In some examples, the bonding may be achieved by overmolding a plastic, e.g., a portion of the housing of the electronic wearable device, over at least a portion of the magnet 2020.

As described herein the protrusion 2008 may be configured for a cooperating fit with an eyewear track (e.g., track 130). In some examples, the protrusion 2008 or at least a portion thereof (e.g., an outer surface of the protrusion) may be made of a material which is softer or of equal hardness as the hardness of the track. In some examples in which the track is coated, the protrusion or portion thereof may be softer or of equal hardness than the coating of the track. In some examples, the protrusion 2008 may be configured to be received in an eyewear track (e.g., a temple track) such that the protrusion is restricted from movement laterally to the length of the track. The attachment side 2006 of the electronic wearable device may be configured in any number of ways such that the magnet does not contact any surface of the eyewear track when the electronic wearable device is coupled to the eyewear via the track.

For example, and referring now also to FIG. 20B, electronic wearable device 2000' includes an attachment portion 2004 similarly to the device 2000 of FIG. 20A but in this example the magnet 2020 is positioned relative to the attachment side 2006 such that it is below the outermost surface 2007 of the attachment side. That is, the outermost surface 2012 of magnet 2020 is located medially in relation to the outermost surface 2007 of the device 2000. In this example, the magnet 2020 is provided in a cavity 2024. In some examples, the surface 2012 of the magnet may be exposed through the opening of the cavity 2024. In some examples, the surface may be coated, painted or otherwise covered. For example, and referring further to FIG. 20C, the magnet 2020 may be embedded below a surface 2026 of the attachment side 2006 such that the surface 2012 of the magnet is not exposed. In both of the examples in FIGS. 20B and 20C, the surface 2012 of the magnet 2020 would be spaced apart from the base of the track by virtue of the magnet being located medially to the outermost surface of the attachment side, and also optionally additionally by virtue of any spacing between the device and the base of the track when coupled thereto, if such spacing is designed into the particular configuration.

In some examples, the protrusion may be defined by at least one bump extending from the attachment side of the device. In some examples, the electronic wearable device may include at least two bumps that are higher (e.g., extend laterally by a greater distance) than the magnet. The bumps may be arranged relative to the magnet such that they are aligned with the length-wise direction of the magnet. As such the bumps may serve as a spacer (e.g., between the outermost surface of the magnet and the track) and/or bumpers (e.g., between the forward and rear end of the magnet so as to prevent the magnet from contacting the front and rear walls of the track when sliding the device along the track). In some examples, the protrusion may be defined by a continuation or at least partially continuous border surrounding at least part of the perimeter of the magnet portion that extends from the attachment side. Other arrangements may be used to implement a protrusion in accordance with the examples herein. For example, where multiple magnets are used, each may be associated with one or more bumps and/or one or more at least partially continuous borders or enclosures around the magnets.

Referring to FIG. 21, an electronic wearable device in the form of a camera 2100 is shown. The camera 2100 includes one or more electronic components (e.g., an image capture device) within a camera body 2102. The device 2100 includes a magnet 2020 for magnetically attaching the device 2100 to any of a plurality of wearable articles, for example eyewear, which may be provided with an eyewear track (e.g., temple track). It will be understood that while specific examples are described herein with reference to attaching electronic wearable devices to eyewear, the examples herein are equally applicable to attaching electronic wearable devices to other types of articles, e.g., a hat, a facemask, a necklace, a ring, a helmet, an accessory or other.

In the example in FIG. 21, the magnet 2020 is an elongate magnet (e.g., a bar magnet) having a first and second longitudinal ends. The protrusion 2108 in this example includes a pair of bumps 2110 extending from the attachment side 2106 and located proximate the first and second longitudinal ends. A first bump is positioned adjacent the first longitudinal end and a second bump is positioned adjacent the second longitudinal end such that the bumps are generally aligned with the longitudinal direction of the magnet. The magnet in this example is aligned with the longitudinal direction of the device 2100 and thus the bumps are also in length-wise alignment with the device. In this arrangement, the bumps 2110 define a length LP of the protrusion, which is greater than a length LM of the magnet (or at least of the exposed portion of the magnet). In some examples, the length LM may be about 12 mm, or anywhere between 10 mm and 16 mm, or anywhere between 8 mm and 20 mm. In some embodiments the length of the protrusion may be about 14 mm, or anywhere between 12 mm and 18 mm, or anywhere between 10 mm and 22 mm.

The individual bumps 2110 may be made of any type of material, which is softer than the magnet, softer than a surface of the eyewear track, or both. In some examples, the bumps can be made of a material that is equal to or less hard than a coating of the eyewear track. In some examples, the bumps or a portion of a bump (e.g., an outer portion or surface of a bump) may be made of a polymer. In some examples, the bumps may be coated with a polymer. As would be appreciated, even a rigid polymer may be softer than the magnet and may thus provide effective protection against scratches. In some examples, the bump or portion thereof may be made of a metal, which is softer than the magnet and/or one or more surfaces of the track. In other examples, wood, paper, a plastic or composite material may be used.

Figure 21B:
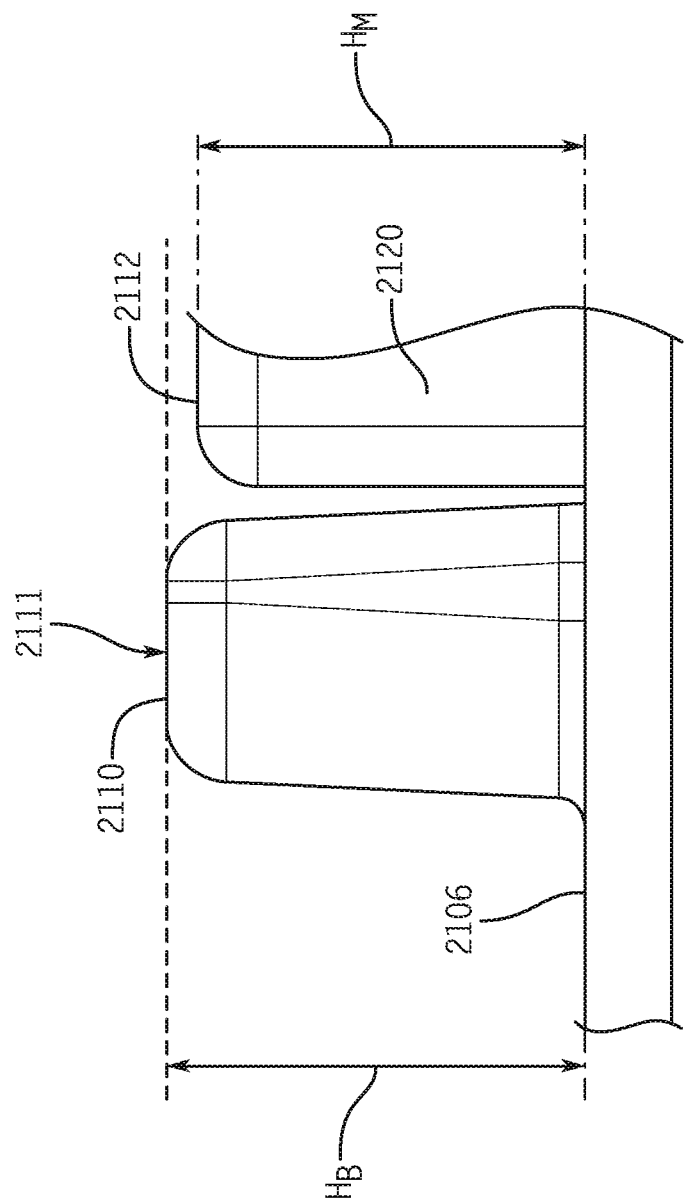

Referring also to the detail views of FIGS. 21A and 21B, the individual bumps 2110 may have a width ($W_B$), a length ($L_B$), and a height ($H_B$) configured to reduce or eliminate any physical contact between the magnet and the eyewear. For example, bump 2110 may have a height $H_B$, which is greater than the height of the protruding portion of the magnet $H_M$, such that the outermost surface (or top surface 2111) of bump 2110 may be above or laterally positioned in relation to the outermost or top surface 2112 of the magnet 2120, as shown in FIG. 21B. IN some examples, the difference in height may be about 0.005 mm or greater. In some examples, the difference in height may be up to about 0.05 mm, up to about 0.1 mm, up to about 0.25 mm, or up to about 1 mm.

The width of the bumps may be slightly smaller than the width of the magnet. For example, the magnet may be about 2 mm wide and the bumps may be about 1.85 mm wide, or anywhere in the range of 1.6 mm to 2 mm. These dimensions are illustrative only and the dimensions as well as relative size of components may be different in other examples. In some examples, the bumps may be as wide or slightly wider than the magnet. In such example, the bumps may thus also prevent contact between the magnet and walls of the track. As described, in yet future examples, bumps or at least a partial border may be provided along the longitudinal sides of the magnet. The bumps can have one or more rounded edges. The rounded edge of a bump can be rounded vertically. The rounded edge can be rounded horizontally. In some examples, the bumps can have a straight edge. In some examples, the bumps may come into contact with the base and/or walls of the track or they may be spaced from the base of the track. In some examples the bumps may be at least partially formed by overmolding or coating a portion of the housing of the device 2100 and/or the magnet 2120 with another material, e.g., a plastic or polymer. In some examples, the bumps may be integrally formed with the housing (e.g., may be of the same material as the housing of the device 2100).

Although the examples in FIGS. 20 and 21 have been described with reference to a camera, the electronic wearable device may be any other type of electronic wearable device other than camera. For example, the electronic wearable device may be or include an image sensing device. The electronic wearable device may be or include an image capture device. The electronic wearable device may be or include a light, a sensor, a switch (e.g., a tilt switch), a motion detector (e.g., an accelerometer), a pedometer, a gas detector (e.g., a $CO_2$ detector), a radiation detector, an energy harvesting device (e.g., a solar energy harvesting device, RF energy harvesting device, or other), an audio device, an assistive hearing device (e.g., a hearing aid), a microphone, a speaker, a health monitor, a location device (e.g., a geolocation device), a laser, a projector, an augmented reality device or system, a virtual reality device or system, a mixed reality device or system, or any combinations thereof.

Although the present disclosure includes, by way of example, illustration and description of some embodiments, it will be understood by those skilled in the art that several modifications to the described embodiments, as well as other embodiments are possible without departing from the spirit and scope of the present invention. It will be appreciated that any of the components, features, or aspects from any of the disclosed embodiments may be used in combination with one another, without limitation, and without departing from the scope of the present disclosure. It will be understood that one or more aspects of any embodiment described herein may be used in combination with aspects of other embodiments. It will also be understood one or more of illustration in the figures herein may not be to scale and certain features may be exaggerated for clarity to illustrate aspects of the present invention.

What is claimed is:

1. An electronic wearable device comprising:
a device body including at least one electronic component, the device body having an attachment side configured to movably attach the electronic wearable device directly to an eyewear temple by magnetic attraction between the electronic wearable device and the eyewear temple, wherein a first magnet or ferromagnetic material is located on or within the electronic wearable device and a second magnet or ferromagnetic material is located within or on the eyewear temple, and wherein the device body is positionable at a first position along a length of the eyewear temple and in a second position along the length of the eyewear temple while remaining attached to the eyewear temple; and
wherein the first magnet or ferromagnetic material does not contact a surface of the second magnet or ferromagnetic material.

2. The electronic wearable device of claim 1, wherein the device body includes a protrusion extending from the attachment side for movably coupling the device body to the eyewear temple, and wherein the magnet is arranged proximate the protrusion such that an outermost lateral surface of the magnet is medially positioned relative to an outermost surface of the protrusion.

3. The electronic wearable device of claim 2, wherein the magnet is an elongate magnet having a first longitudinal end and a second longitudinal end, and wherein the protrusion comprises a plurality of bumps extending from the attachment side of the device body, each of the plurality of bumps positioned proximate one of the first or second longitudinal ends of the magnet.

4. The electronic wearable device of claim 3, wherein the plurality of bumps comprise a softer material than the magnet, the surface of the eyewear temple, or both.

5. The electronic wearable device of claim 3, wherein the plurality of bumps are made of a polymer.

6. The electronic wearable device of claim 3, wherein the bumps are coated with a polymer.

7. The electronic wearable device of claim 2, wherein the protrusion is configured for a cooperating fit with an eyewear track.

8. The electronic wearable device of claim 7, wherein the protrusion or an outermost surface of the protrusion is made of a material which has a hardness equal to or less than a hardness of a coating of the track.

9. The electronic wearable device of claim 7, wherein the protrusion is configured to be received in the eyewear temple track such that the protrusion is restricted from movement laterally to the length of the track.

10. The electronic wearable device of claim 7, wherein the attachment side is configured such that the magnet does not contact any surface of the eyewear track when the electronic wearable device is coupled to the eyewear via the track.

11. An eyewear system comprising the electronic wearable device of claim 7 and an eyewear including the eyewear temple, wherein the eyewear temple includes an insert, and wherein a base of the track is defined, at least in part, by the insert.

12. The eyewear system of claim 11, wherein the insert is made of a ferromagnetic material.

13. The eyewear system of claim 12, wherein the insert is coated by a non-ferromagnetic material.

14. The eyewear system of claim 11, wherein the insert is coated by a ferromagnetic material.

15. The eyewear system of claim 11, wherein a width of the track does not exceed 3.0 mm, wherein a depth of the track does not exceed 2.0 mm, or both.

16. The electronic wearable device of claim 1, wherein the magnet is recessed below a surface of the attachment side.

17. The electronic wearable device of claim 1, wherein the device body defines a cavity on the attachment side and wherein the magnet is positioned in the cavity such that it is below a surface of the attachment side, and wherein an outermost lateral side of the magnet is exposed through an opening of the cavity.

18. The electronic wearable device of claim 1, wherein the magnet is embedded below a surface of the attachment side.

19. The electronic wearable device of claim 1, wherein the electronic wearable device is a camera, an image capture device, a light, a sensor, an augmented reality device, a virtual reality device, or a mixed reality device.

20. The electronic wearable device of claim 1, wherein the electronic wearable device is removably attachable to any of a plurality of different types of wearable articles other than eyewear.

21. A system comprising the electronic wearable device of claim of claim 20 and a wearable article selected from the group of a hat, a facemask, a necklace, a ring, a helmet, a wearable article other than eyewear, and an accessory.

* * * * *